US009740368B1

(12) United States Patent
Love et al.

(10) Patent No.: US 9,740,368 B1
(45) Date of Patent: Aug. 22, 2017

(54) POSITIONING LABELS ON GRAPHICAL VISUALIZATIONS OF GRAPHS

(71) Applicant: Quid, Inc., San Francisco, CA (US)

(72) Inventors: Oriana Jeannette Love, Alameda, CA (US); Mary Kate Lowe, San Francisco, CA (US); Hao Wu, San Francisco, CA (US)

(73) Assignee: Quid, Inc., San Francisco, CA (US)

( * ) Notice: Subject to any disclaimer, the term of this patent is extended or adjusted under 35 U.S.C. 154(b) by 0 days.

(21) Appl. No.: 15/233,007

(22) Filed: Aug. 10, 2016

(51) Int. Cl.
*G06F 3/0481* (2013.01)
*G06F 3/0484* (2013.01)
*G06T 11/20* (2006.01)

(52) U.S. Cl.
CPC ...... *G06F 3/04817* (2013.01); *G06F 3/04842* (2013.01); *G06F 3/04845* (2013.01); *G06T 11/206* (2013.01); *G06T 2200/24* (2013.01)

(58) Field of Classification Search
CPC .................................................. G06F 3/04817
USPC .......................................................... 715/853
See application file for complete search history.

(56) References Cited

U.S. PATENT DOCUMENTS

| | | | | |
|---|---|---|---|---|
| 5,339,428 A * | 8/1994 | Burmeister | ............ | G06F 8/441 717/141 |
| 5,870,559 A * | 2/1999 | Leshem | ............ | G06F 11/32 707/E17.116 |
| 6,091,424 A * | 7/2000 | Madden | ............ | G06T 11/206 345/619 |
| 6,144,962 A * | 11/2000 | Weinberg | ............ | G06F 11/32 |
| 6,357,041 B1 * | 3/2002 | Pingali | ............ | G06F 8/453 711/E12.017 |
| 6,496,832 B2 * | 12/2002 | Chi | ............ | G06F 17/246 |
| 6,509,898 B2 * | 1/2003 | Chi | ............ | G06F 17/30014 345/440 |
| 6,671,711 B1 * | 12/2003 | Pirolli | ............ | G06F 17/30014 707/999.002 |
| 6,714,936 B1 * | 3/2004 | Nevin, III | ............ | G06F 17/30395 |
| 7,131,060 B1 * | 10/2006 | Azuma | ............ | G06T 11/60 715/260 |

(Continued)

OTHER PUBLICATIONS

Mbostock, "Voronoi Labels", available at <<http://bl.ocks.org/mbostock/6909318>>, archived on Oct. 10, 2013 at wayback machine <<http://web.archived.org>>, 1 page.*

(Continued)

*Primary Examiner* — Reza Nabi
*Assistant Examiner* — Daniel Rodriguez
(74) *Attorney, Agent, or Firm* — Pillsbury Winthrop Shaw Pittman LLP

(57) ABSTRACT

Provided is a process, including: obtaining a graph to be visually represented in a graphical user interface of a client computing device; obtaining a set of text labels each corresponding to a respective collection of the nodes; determining a two dimensional or higher layout of the icons in the visual representation; segmenting the field of view into a plurality of segments; determining which icons are disposed within each of the segments of the field of view; determining positions of the text labels in the visual representation relative to one or more icons representing nodes in the respective collection of nodes based on the segment of the field of view in which the one or more icons representing nodes in the respective collection are disposed; and causing the visual representation to be displayed.

23 Claims, 14 Drawing Sheets

(56) References Cited

U.S. PATENT DOCUMENTS

| | | | | |
|---|---|---|---|---|
| 7,356,777 | B2* | 4/2008 | Borchardt | G06F 3/04815 345/441 |
| 7,509,244 | B1* | 3/2009 | Shakeri | G06F 9/5044 703/13 |
| 8,407,590 | B1* | 3/2013 | Shamis | G06F 17/30905 715/273 |
| 8,515,957 | B2* | 8/2013 | Knight | G06F 17/30713 707/737 |
| 8,650,492 | B1* | 2/2014 | Mui | G06F 17/30873 715/736 |
| 8,671,353 | B1* | 3/2014 | Varadarajan | G06Q 30/0201 715/763 |
| 8,805,845 | B1* | 8/2014 | Li | G06F 17/30958 707/738 |
| 9,015,633 | B2* | 4/2015 | Takamura | G06F 3/04815 715/765 |
| 9,141,882 | B1* | 9/2015 | Cao | G06K 9/6251 |
| 9,361,377 | B1* | 6/2016 | Azari | G06F 17/30029 |
| 2003/0234782 | A1* | 12/2003 | Terentyev | G06T 19/00 345/421 |
| 2005/0182764 | A1* | 8/2005 | Evans | G06F 17/3071 |
| 2006/0184481 | A1* | 8/2006 | Zhang | G06F 17/30616 706/45 |
| 2007/0011146 | A1* | 1/2007 | Holbrook | G06Q 30/0603 |
| 2007/0109297 | A1* | 5/2007 | Borchardt | G06F 3/04815 345/419 |
| 2007/0198459 | A1* | 8/2007 | Boone | G06F 17/30716 |
| 2008/0033944 | A1 | 2/2008 | Frank | |
| 2008/0059452 | A1 | 3/2008 | Frank | |
| 2009/0097074 | A1* | 4/2009 | Kawamura | H04N 1/4055 358/3.13 |
| 2009/0216436 | A1 | 8/2009 | Liu | |
| 2010/0106426 | A1 | 4/2010 | Hunt et al. | |
| 2010/0180081 | A1* | 7/2010 | Bose | G06F 1/3203 711/122 |
| 2011/0134128 | A1* | 6/2011 | Hu | G06T 11/206 345/440 |
| 2011/0161410 | A1* | 6/2011 | Khurana | G06F 9/5072 709/203 |
| 2011/0307838 | A1 | 12/2011 | Dwyer et al. | |
| 2012/0054226 | A1* | 3/2012 | Cao | G06F 17/30941 707/769 |
| 2012/0151393 | A1* | 6/2012 | Arndt | G06F 17/30604 715/765 |
| 2012/0290988 | A1* | 11/2012 | Sun | G06F 17/30572 715/853 |
| 2012/0311496 | A1* | 12/2012 | Cao | G06F 17/30601 715/821 |
| 2013/0088495 | A1* | 4/2013 | Bech | G06T 13/00 345/467 |
| 2013/0110838 | A1* | 5/2013 | Lidy | G06F 17/30598 707/737 |
| 2013/0328882 | A1* | 12/2013 | Pirwani | G06K 9/6223 345/441 |
| 2014/0095328 | A1* | 4/2014 | Forouzandeh | G06Q 30/0277 705/14.73 |
| 2014/0181098 | A1* | 6/2014 | Bhandari | G06F 17/30722 707/728 |
| 2014/0222721 | A1* | 8/2014 | Stock | G06N 99/005 706/11 |
| 2014/0223271 | A1* | 8/2014 | Racklyeft | G06T 13/80 715/201 |
| 2014/0229879 | A1* | 8/2014 | Lee | G06F 3/04815 715/771 |
| 2014/0250377 | A1* | 9/2014 | Bisca | G06F 17/30011 715/705 |
| 2014/0372956 | A1* | 12/2014 | Bisca | G06F 17/30958 715/848 |
| 2015/0033106 | A1* | 1/2015 | Stetson | G06F 17/30958 715/215 |
| 2015/0089366 | A1* | 3/2015 | Beckett | G06F 3/0484 715/716 |
| 2015/0161305 | A1 | 6/2015 | Kazama | |
| 2015/0248476 | A1 | 9/2015 | Weissinger et al. | |
| 2015/0288569 | A1* | 10/2015 | Agarwal | H04L 41/0879 709/224 |
| 2015/0370439 | A1* | 12/2015 | Val | G06F 17/30 715/830 |
| 2016/0004705 | A1* | 1/2016 | Petrocik | G06F 17/3053 707/727 |
| 2016/0034757 | A1* | 2/2016 | Chhichhia | G06K 9/00469 382/206 |
| 2016/0103932 | A1* | 4/2016 | Sathish | G06F 3/048 715/767 |
| 2016/0147891 | A1* | 5/2016 | Chhichhia | G06F 17/30867 707/734 |
| 2016/0155067 | A1 | 6/2016 | Dubnov et al. | |
| 2016/0203209 | A1 | 7/2016 | Clinchant et al. | |
| 2016/0210556 | A1 | 7/2016 | Ben Simhon et al. | |
| 2016/0224544 | A1 | 8/2016 | Tristan et al. | |
| 2016/0232157 | A1* | 8/2016 | Mansour | G06F 17/30011 |
| 2016/0232630 | A1* | 8/2016 | Admon | G06Q 50/18 |
| 2016/0239572 | A1* | 8/2016 | Gutierrez Munoz | G06F 17/30867 |
| 2016/0357416 | A1* | 12/2016 | Abuduweili | G06F 3/04845 |

OTHER PUBLICATIONS

Morgan, Jeffery, "A Genetic Algorithm for Feature Labelling in Interactive Applications", available at <<http://usabilityetc.com/articles/feature-labelling-genetic-algorithm/>>, archived on Apr. 24, 2013 at wayback machine <<http://web.archived.org>>, 10 pages.*

Automatic label placement', Wikipedia, https://en.wikipedia.org/wiki/Automatic_label_placement, Nov. 24, 2015, pp. 1 to 3.

Placing Text Labels on Maps and Diagrams', https://www.eecs.harvard.edu/shieber/Biblio/Papers/jc.label.pdf, Academic Press, Inc., Mar. 8, 2002, pp. 1 to 10.

Positioning Names on Maps' The American Cartographer, vol. 2, No. 2, 1975, pp. 128-144.

* cited by examiner

703 determining a feature vector for each document, each feature vector having plurality of scores, each score corresponding to a given n-gram and being based on:
    an amount of occurrences of the given n-gram in the respective document,
    a length of the respective document,
    an amount of occurrences of the given n-gram in a plurality of other documents different from the respective document, and
    whether the given n-gram is among the set of n-grams pertaining to the selected topic;

— 704 determining an adjacency matrix based on the feature vectors, wherein rows and columns of the adjacency matrix correspond to the documents, values of the feature matrix correspond to a selected-topic-adjusted semantic similarity of documents corresponding to the respective row and column of the values, and values of the feature matrix are based on angles between feature vectors of the documents corresponding to the respective row and column of the values, the operations comprising steps for reducing movement of data across a memory hierarchy;
    some of the icons are cluster icons that represent clusters of the graph;
    some of the icons are node icons that represent nodes of the clusters and are positioned in the visual representation adjacent a cluster icon of a cluster in which the corresponding node is disposed;
    determining a layout of the icons comprises determining a force directed layout in which the cluster icons are subject to different forces relative to the node icons;
    the segments correspond to quadrants of the field of view;
    determining positions of the text labels in the visual representation comprises:
        positioning a text label in an upper left quadrant upward and to the left of a corresponding icon;
        positioning a text label in a lower left quadrant downward and to the left of a corresponding icon;
        positioning a text label in an upper right quadrant upward and to the right of a corresponding icon; and
        positioning a text label in a lower right quadrant downward and to the right of a corresponding icon.

707 — sub-dividing the field of view according to a Voroni diagram of the icons positions after determining the layout to form a plurality of Voroni regions by performing a k-means cluster of vertical and horizontal coordinates of the icons in the field of view;

708 — segmenting each of the Voroni regions into a plurality of sectors about a point at a location selected based on a centroid of the respective Voroni region.

FIG. 12 animating a movement of a text label from a pre-zoom position relative to a corresponding icon to a post-zoom position relative to the corresponding icon by:

animating movement according to a cubic-Bezier translation; or animating movement according to an ease-in translation, an ease-out translation, or both

POSITIONING LABELS ON GRAPHICAL VISUALIZATIONS OF GRAPHS

BACKGROUND

1. Field

The present disclosure relates generally to graph analysis and, more specifically, to automatically positioning text labels on visual representations of graphs.

2. Description of the Related Art

Graphs are powerful data models for understanding systems in which relationships between entities are important. Examples include graphs characterizing relationships between documents, like semantic similarity between each document in a corpus, such as news articles published in a given decade, or between websites, or between scientific journal articles. Other examples include graphs characterizing relationships between other entities, like between companies, countries, or people, such as graphs relating exchanges there between or similarities there between.

SUMMARY

The following is a non-exhaustive listing of some aspects of the present techniques. These and other aspects are described in the following disclosure.

Some aspects include a process of arranging labels on a visual representation of a graph data structure, the process including: obtaining, with one or more processors, a graph to be visually represented in a graphical user interface of a client computing device, the visual representation including a plurality of icons each representing one or more nodes of a graph data structure and links extending between the icons in the visual representation; obtaining, with one or more processors, a set of text labels each corresponding to a respective collection of the nodes; determining, with one or more processors, a two dimensional or higher layout of the icons in the visual representation within a field of view; segmenting, with one or more processors, the field of view into a plurality of segments; determining, with one or more processors, which icons are disposed within each of the segments of the field of view; determining, with one or more processors, positions of the text labels in the visual representation relative to one or more icons representing nodes in the respective collection of nodes based on the segment of the field of view in which the one or more icons representing nodes in the respective collection are disposed; and causing, with one or more processors, the visual representation to be displayed.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements:

FIG. 11 shows a collection of operations;

FIG. 12 shows a collection of operations;

FIG. 14 shows a collection of operations.

Figure 1:
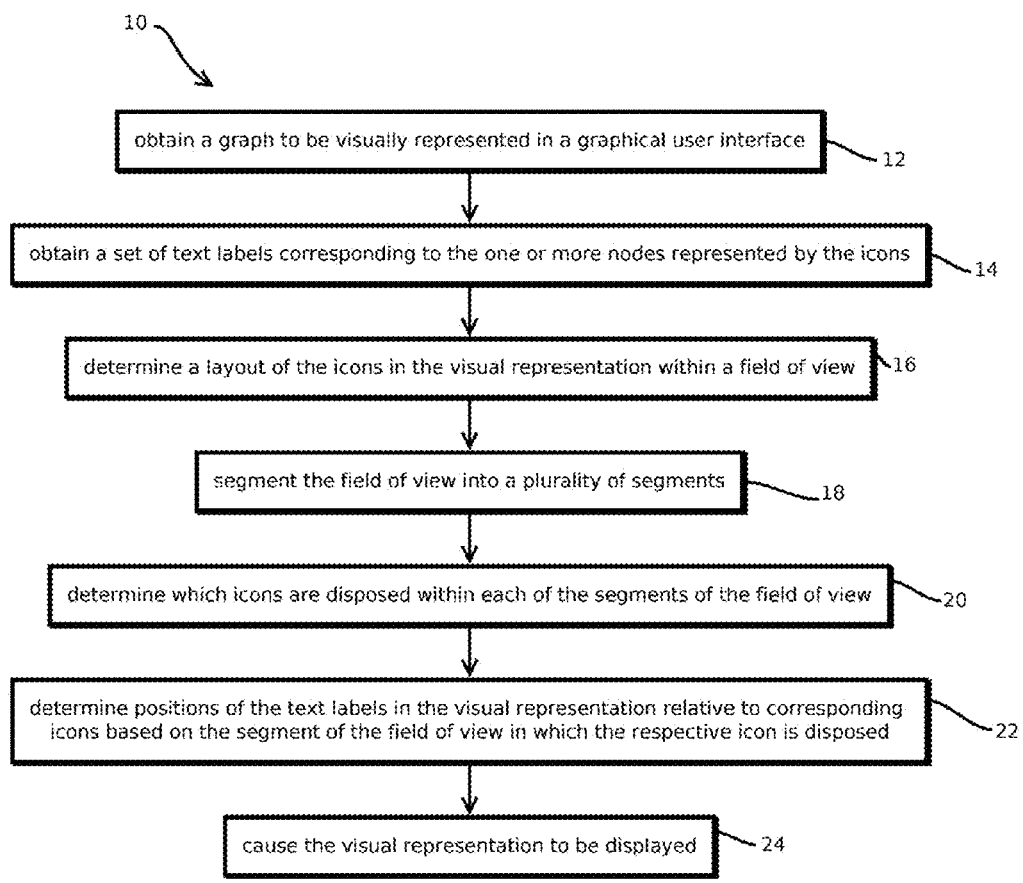
FIG. 1 illustrates an example of a process by which text labels are automatically positioned on a visual representation of a graph.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer science and human-computer interaction. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

As noted above, visualizations of graph data structures can be quite useful for analysts seeking to understand a relatively large collection of items and relationships there between. But often such visualizations are difficult for the user to visually parse because elements of the graph can become relatively crowded, for instance, in regions of the graphical visualization that contain a relatively large number of graphical elements in close proximity, e.g., arising from relatively strong relationships between those elements. At the same time, in some cases, graphical visualizations of graph data structures often include text labels associated with the graphical elements, like icons representing nodes or clusters and lines connecting those nodes are clusters. This text can become relatively crowded and difficult to read in areas of the graph where items are positioned in close proximity. As a result, there is often a tension between the amount of textual information presented on a graph, and the positioning of related icons near one another, both of which convey useful information. This can lead to graphical visualizations that are less informative than might otherwise be the case, for instance as a result of including less text or as a result of the text being positioned in places that make the text difficult to read.

Some embodiments may mitigate these problems with the techniques described below with reference to FIGS. 1 through 8. In some embodiments text associated with icons in a graphical representation may be positioned based on the respective icon's location in a field of view of the graph. In some cases, text labels for icons in each quadrant of the field of view are positioned relative to the icon according to that quadrant, for instance, with text labels in the upper left quadrant being positioned upward and to the left of the respective icon, text labels in the lower right quadrant being positioned lower and to the right of the respective icon, and so on, through each of the four quadrants. As a result, the text labels are expected to tend to be relatively spread apart from one another, particularly near central regions of the graph, thereby making the text easier to read while including a relatively rich set of text labels. Some embodiments may determine the graphical representation and the arrangement of text labels automatically, for example, in the context of the computational linguistics system described below with reference to FIG. 8, and in some cases, those text labels may be displayed on the graphical representations like those shown in FIGS. 2 through 7. In some cases, these techniques may be implemented with one or more of the computer systems described below with reference to FIG. 9.

In some cases, the process 10 of FIG. 1 may determine the positioning of text labels in a graphical visualization of a graph data structure. In some embodiments, the operations of process 10 may be encoded as computer program instructions in a tangible, non-transitory, machine-readable medium such that when the instructions are executed by one or more data processing apparatuses, like those described below with reference to FIG. 9, the operations described are effectuated. In some cases, these steps may be performed in a different order from that presented, steps may be omitted, and in some cases some steps may be performed concurrently on subsets of data sets to expedite operations, none of which is to suggest that any other feature described herein may not also be similarly varied. In some embodiments, the process 10 may be performed by the computational linguistics system described below with reference to FIG. 8, for instance at the direction of a remote client computing device interfacing with that system.

In some embodiments, the process 10 begins with obtaining a graph to be visually represented in a graphical user interface, as indicated by block 12. In some cases, the graphical user interface is a remote graphical user interface, such as in a web browser executing on a remote client computing device, and the graph is obtained in the context of a server-side process, like in the computational linguistics system described below with reference to FIG. 8. In some cases, the graph may include a graph of the types described below with reference to that system. Examples include semantic similarity graphs of collections of documents, where nodes of the graph correspond to documents, and edges of the graph correspond to semantic similarity (or other relationships) between those node's unstructured text.

These techniques, however, are applicable to a wide variety of different types of graphs, such as graphs in which nodes correspond to various entities like people, businesses, topics, products, and the like. In some cases, the graph may be relatively large, for instance having more than 1000, more than 5000, and in some cases more than 100,000 nodes, with as many as two, four, or 10 times as many edges between the nodes. In some cases, the edges may be weighted edges, such as directed or undirected weighted edges extending between respective pairs of the nodes.

In some embodiments, the graph may be a clustered graph, for instance a graph clustered according to the Markhov clustering algorithm described below. In some embodiments, the graph may be associated with a plurality of clusters such as more than 10 clusters, more than 15 clusters, or more than 100 clusters, each cluster having on average a relatively large number of nodes, for instance, more than 10, more than 100, or more than 1000. In some cases, each cluster may be associated with a set of nodes in the cluster.

In some embodiments, subsets of the nodes associated with each cluster may be designated as having particular significance. For example, some embodiments may identify nodes that are particularly representative of the cluster, for instance, having an attribute value close to a mean value of the attribute for the cluster, or nodes may be designated in virtue of having an outlier attribute value. For example, some embodiments may determine which topics score relatively highly for the respective cluster and designate nodes that score highly in those topics as significant for the cluster. Other embodiments may identify nodes that tend to be particularly representative of the cluster and nodes that tend to be outliers of the cluster, such as nodes having a attribute value more than a threshold number of standard deviations from a mean of the cluster. In some cases, the attributes correspond to unstructured text of documents corresponding to nodes, like topics and keyword mentions. In some cases, the attributes correspond to metadata about the nodes, such as the number of times a particular document was shared in a social media network, the number of times users commented on a document, and the like. In some cases, the attributes pertain to edge properties of nodes, such as a number of edges, edges extending between topics, a median edge weight, and the like.

The visual representation may take a variety of different forms. In some cases, each of the nodes may be visually represented, for instance as an icon. In some embodiments, this may lead to a visual representation that is too crowded for a user to readily visually parse. Accordingly, some embodiments may instead visually represent the clusters, for instance without displaying nodes, like with each cluster being represented by an icon having a size or other visual attributes that corresponds to the size of the cluster. In some cases, the clusters may be linked to one another, for instance based on aggregate properties of edges extending between nodes of the respective clusters, like an average number of edges, an average weight of edges, a weighted average of edge weights, an overlap in topics, and the like. In some cases, the visual representation may include both icons representing clusters and icons representing a subset of the nodes, such as those designated as significant according to the techniques described above. In some embodiments, the icons representing nodes may have a different visual appearance from the icons represent clusters and may be positioned relative to the clusters, such as adjacent to the icons representing the corresponding clusters. Examples of such a visual representation are shown below with reference to FIG. 2.

Figure 2:
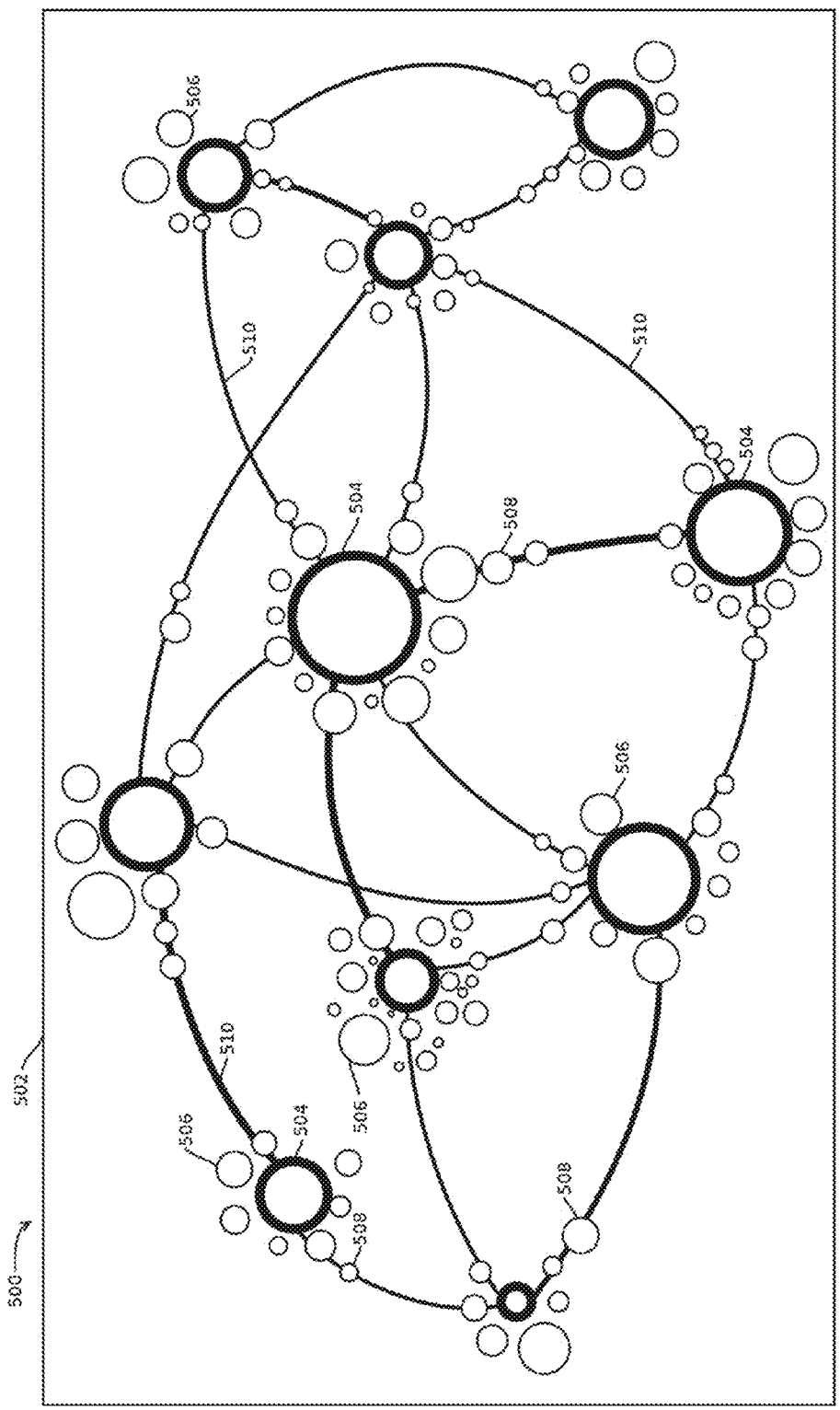
FIG. 2 illustrates an example of a visual representation that may be augmented with the process of FIG. 1.

FIG. 2 illustrates a visual representation 500 within a field-of-view 502. In some embodiments, the field-of-view 502 may be a field-of-view in a web browser of a client computing device, or the field-of-view may be a direction in which a user is looking in a virtual-reality or augmented reality display resulting in a rendered display. In some embodiments, the field-of-view 502 includes a plurality of cluster icons 504 surrounded by node icons 506 and 508. In some embodiments, the node icons 506 and 508 may be nodes deemed significant according to the techniques described above for the respective cluster.

In some embodiments, each cluster icon 504 may represent a corresponding cluster in the underlying graph being visualized. In some embodiments, a visual attributes of the cluster icon 504 may correspond to attributes of the cluster, such as size or density of the cluster corresponding to a radius of the icon. In some cases, visual attributes of the cluster icons 504 may be varied according to a variety of different properties, for instance with attributes like color, line weight, drop shadow, saturation, transparency, animated vibrations, and the like corresponding to attributes like a number of nodes in the cluster, a density of the cluster, a topic addressed by unstructured text in the cluster, aggregate statistics of metadata of nodes in the cluster, and the like.

As noted, some embodiments may include node icons 506 and 508 adjacent the cluster icon 504 to which the node icons pertain. In some embodiments, two types of node icons 506 and 508 may be included. In some cases, node icons 506 correspond to nodes that are significant in virtue of metadata or unstructured text attributes of the respective node, such as according the techniques described above. In some embodiments, the node icons 508 may be significant in virtue of edge properties of the respective node, like a particularly high score of a topic of a cluster to which the cluster of that respective node connects, a number of edges connected to that node, a median number of edge weights of edges connect to that node, and the like. In some cases, the edge node icons 508 may be positioned on a line 510 connecting to clusters 504. In some cases, the edges 510 may indicate an amount of edges of nodes in connected clusters extending between the clusters, such as greater than a threshold amount. In other cases, the width or color of the lines 510 may indicate a cooccurrence of topics, a cooccurrence of keywords, cross citation, and the like. In some cases, where edge node icons arise from cooccurrence of topics or other attributes by which clusters are length, the edge node icons 508 may positioned on the line between those respective clusters.

In some cases, the node icons 506 and 508 may be positioned adjacent the respective cluster icon 504, for instance according to a force directed arrangement, such as according to a physics simulation, like those described below, in which the respective cluster icon 504 has a mass with gravity or a charge that attracts the node icons, and a physics simulation may be executed to allow the node icons to settle into a final position. In some cases, the node icons 506 and 508 in the simulation may be modeled as having a larger perimeter than that depicted to maintain some separation or as having a repellent force that engages materially in smaller distances than the force that attracts them to the respective cluster icon.

To simplify the view of FIG. 2, examples of the various types of icons are labeled, but it should be understood that the similar elements have similar designations.

In the illustrated graph, each of the clusters 504 may be positioned relative to one another according to a force directed layout as well. For example, the lines 510 connecting the respective clusters may be modeled according to a physics model, like according to springs, with the clusters 504 being modeled is having a repellent force, placing the springs intention. In some cases, the springs corresponding to the lines 510 may tend to pull the clusters towards one another in the simulation, while the repellent force modeled for the respective clusters 504 may tend to push the clusters apart. In some cases, the simulation may be run to permit the clusters to settle into a relatively low energy state, and that relatively low energy state, such as less than a threshold amount or after a threshold number of iterations of modeling, may be designated as the graphical representation to be displayed to the user. In some cases, the graphical representation may be displayed as animated sequence in which the simulation is executed, and the clusters and other elements are shown in the animation transitioning between a higher energy state and a lower energy state, for instance, by translating across the field-of-view 502 into their final position.

In the illustrated embodiment, the respective icons 506, 508, and 504 are shown as circles, but embodiments are consistent with a variety of other shapes, such as squares, octagons, triangles, and the like. In some cases, the different icons may have different shapes, such as with squares designating nodes and circles dedicating clusters. In some cases, the shapes may be symmetric regular shapes, or in some embodiments, the shapes may have irregular shapes, such as a convex hull of an underlying cluster of nodes, for instance after running a force directed physics simulation of the underlying cluster.

In some embodiments, the line weight of lines 510 may indicate a strength of connection between the clusters, such as an amount of overlapping topics addressed, an amount of edges extending therebetween, and average weight of edges extending therebetween (e.g., edges of nodes in each of the two clusters connected by a line 510), and the like. In some embodiments, the lines 510 may be curved, for instance according to a Bezier curve. In some embodiments, parameters of the Bezier curve may be also constructed according to a physics simulation, for instance with lines extending from the respective clusters generally being repelled one another to cause the respective lines to distribute around the respective cluster icon 504.

As shown in FIG. 2, the respective icons are unlabeled with text. Some embodiments of the process 10 of FIG. 1 may determine positions of that text in the field-of-view 502.

As shown in FIG. 1, next, some embodiments may obtain a set of text labels corresponding to the one or more nodes represented by the icons, as indicated by block 14. In some cases, the text labels may indicate topics scoring relatively highly in the aggregate for respective clusters, topics scoring relatively highly for particular nodes, keywords or other n-grams having relatively high TF-IDF or BM25 scores within the respective cluster or node, or the like. In some cases, such attributes of nodes may be aggregated within the cluster to determine the text associated with the cluster, such as a measure of central tendency or by identifying outliers. Examples of such measures of central tendency include a mean, mode, and median. In some embodiments, the text labels are associated with scores indicating a significance or prominence of the respective text label, such as a score indicating an amount by which a particular topic scores particularly highly for the respective cluster or similar scores for n-grams.

Next, some embodiments may determine a layout of the icons in the visual representation within a field-of-view, as indicated by block 16. In some cases, the step may include performing the physics simulation to generate a force directed layout, like that shown below with reference to FIG. 2. Or some embodiments may use other techniques to determine the layout, such as a spectral layout, or an orthogonal layout, a tree layout, a layered graph drawing, circular layouts, dominance drawing, and the like.

Figure 3:
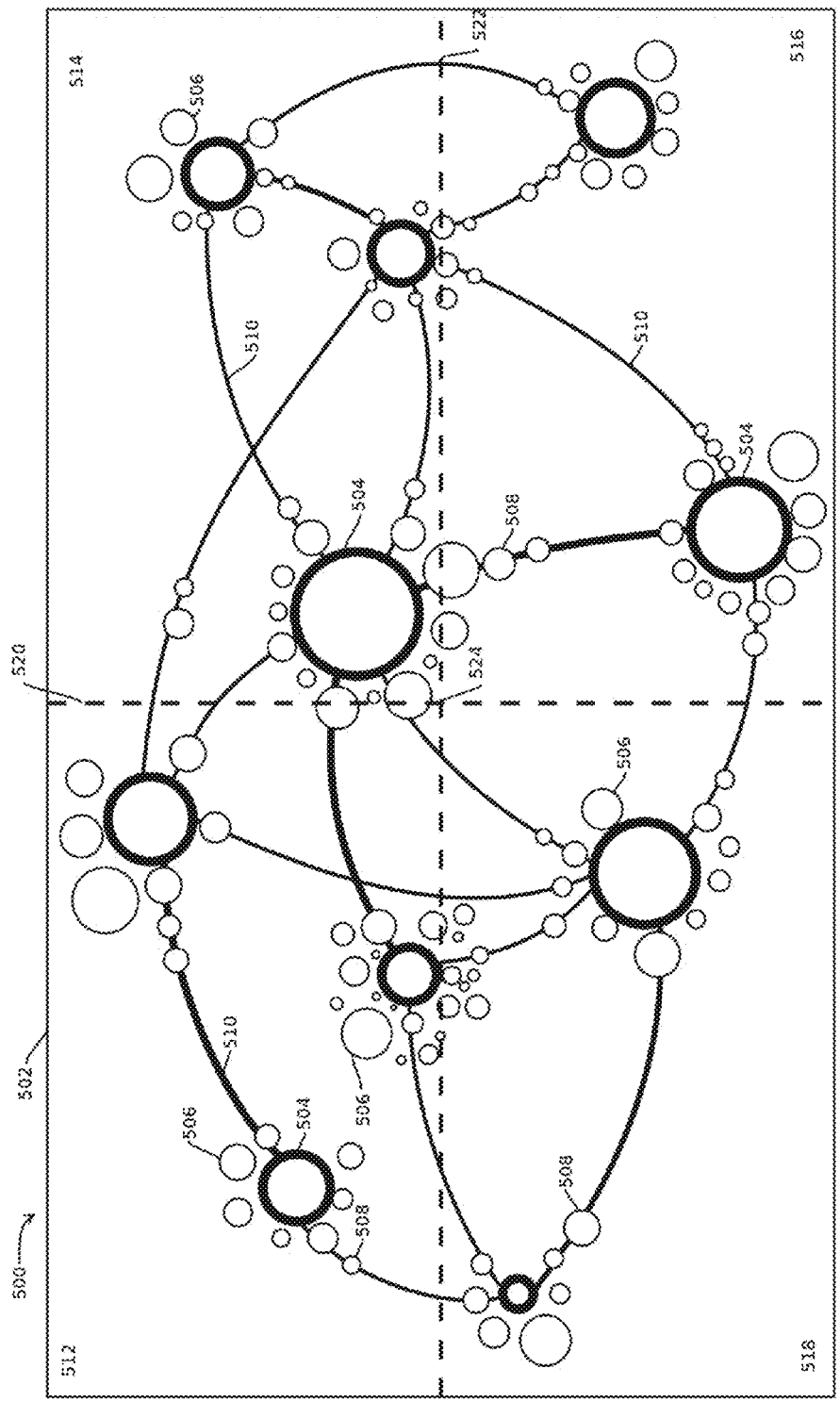
FIG. 3 illustrates the visual representation of FIG. 2 following segmentation.

Next, some embodiments may segment the field-of-view into a plurality of segments, as indicated by block 18. In some cases, the field-of-view may be segmented into quadrants, as shown in FIG. 3. As illustrated, field-of-view 502 has been segmented into quadrants 512 (an upper left quadrant), quadrant 514 (an upper right quadrant), quadrant 516 (a lower right quadrant), and quadrant 518 (a lower left quadrant). In some cases, the quadrants may be defined by segment axes 520 and 522, which may be represented as threshold values in memory of a routine, such as threshold pixel positions along a vertical and horizontal axis. These thresholds need not be drawn in the visualization. In some cases, the segment lines are boundaries 520 and 522 may extend from a central point 524.

In some embodiments, the segment boundaries 520 and 522 may be generally straight lines extending radially outward from the central point 524. Or in other embodiments, these lines may curve or have other shapes. In some embodiments, the central point 524 may be positioned in a center of the field-of-view 502, or some embodiments may position the central point 524 with respect to the position of the icons of the graphic visualization 500, for instance at a centroid of these icons, e.g., accounting for the position and size of the icons, like with a center of mass calculation where size corresponds to density or mass of the respective icons. For instance, if a collection of icons is relatively concentrated on the right side of the visualization 500, with relatively few or sparsely distributed icons on the left side, the center of mass may tend to appear on the right side, and the segments may be shifted to the right, in some embodiments.

Figure 6:
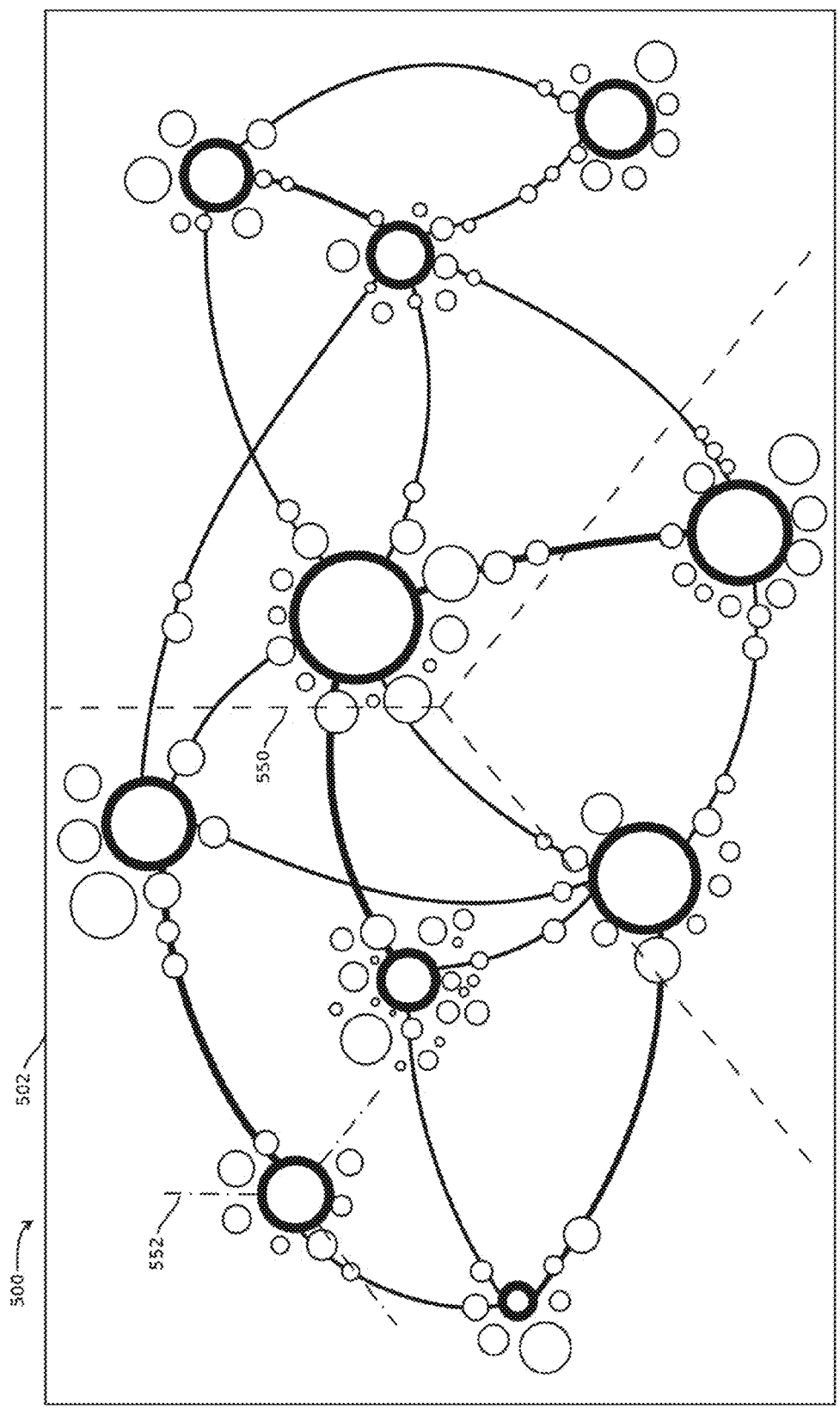
FIG. 6 illustrates the segmented visual representation of FIG. 3 following application of text labels with sub-segments depicted.

In some cases, a variety of different types of segmenting techniques may be used. In other embodiments, a different number of segments may be defined, for instance, three segments may be defined as shown in FIG. 6, like with each segment having a corresponding angle around the center point, with the segments defined by lines 550. An example is shown in FIG. 6, with each segment being afforded 120° angles, but embodiments are consistent with other arrangements, such as segments having less than 90° angles, like 45° angle segments symmetrically distributed around the center point of the field-of-view 502.

In other embodiments, the segments may not have a center point around which the segment boundaries are symmetrically or otherwise arranged. For example, some embodiments may subdivide the field of view 502 according to a k-means clustering algorithm, where clusters or icons are clustered according to position in the field of view, for instance into an integer number of areas, like two, four, five, eight, 12, or more integer areas, like in a Voroni diagram. This arrangement is expected to lead to relatively clear arrangement of text where a force directed layout drives the cluster icons relatively far part into various groupings. It should be emphasized that in some embodiments, this clustering is different from the clustering of nodes, as this clustering is based on a position of icons in a graphical display, while the other is based on attributes of the things represented by the clusters.

In some cases, a number of clusters (referred to as K) may be obtained, e.g., specified by an analyst or estimated. Some embodiments may then place K points into the parameter space occupied by the vectors corresponding to coordinates in the display. In some cases, the initial placement may be random, e.g., pseudorandom. Next, some embodiments may assign each vector to the point that is closest in the parameter space. Then, some embodiments may calculate a centroid for each of the groups of vectors (with groups being defined by which point the vectors are assigned to). Some embodiments may then designate the centroids as the new points. The vector assignment and centroid re-calculation steps may be repeated iteratively until less than a threshold amount of vectors change groups between iterations (e.g., no vectors change).

Next, some embodiments may determine which icons are disposed within each of the segments of the field-of-view, as indicated by block 20. In some cases, icons may be determined to be within a segment based on an associated cluster icon, for instance node icons associated with the cluster icon may be designated as belonging to a segment of that cluster icon, or in some cases, each icon may be separately designated according to the segment in which the respective icon falls, with some clusters potentially having some nodes in differing segments. In some embodiments, an icon may be designated as being within a segment in response to determining that a center point or a centroid of the respective icon falls within that segment. In some cases, clusters on segment boundaries may be designated as being in or out of the segment randomly, or according to an alternating value, such that consecutive determinations reach alternating results.

Figure 4:
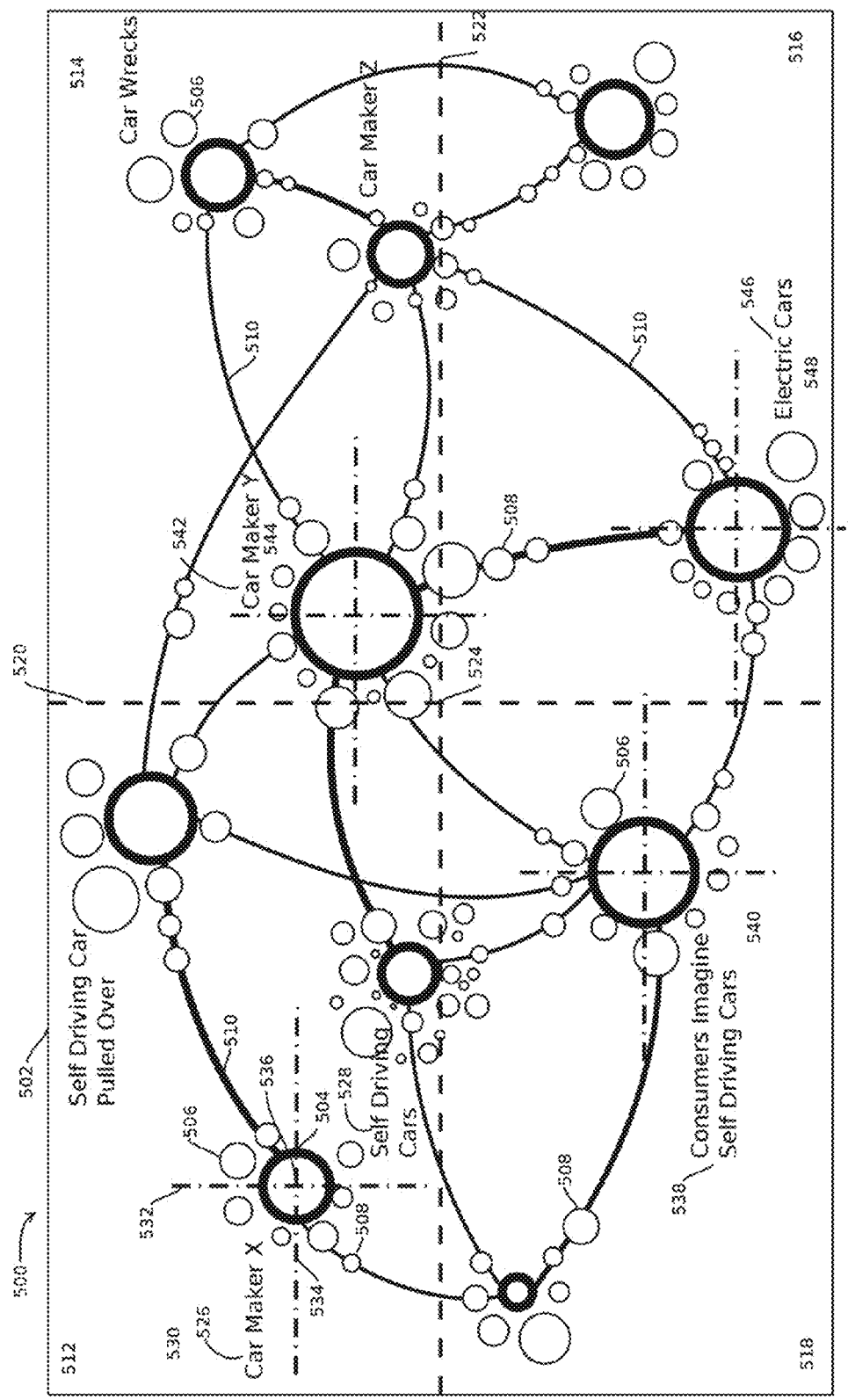
FIG. 4 illustrates the segmented visual representation of FIG. 3 following application of text labels with sub-segments depicted.

Next, some embodiments may determine positions of the text labels in the visual representation relative to corresponding icons based on the segment of the field-of-view in which the respective icon is disposed, as indicated by block 22. An example of such a determination is illustrated in FIG. 4. As shown, the region around an icon may be augmented to have text 526 pertinent to that icon, such as cluster icon 504 adjacent the text 526, and the area around that respective icon may be divided into sub-segments, for instance by sub-segment boundaries 532 and 534 distributed around an icon center point 536. Additional text 528 may be distributed adjacent another cluster and correspond to that cluster. In some cases, the adjacent text 526 and 528 may be positioned such that the text does not overlap other text. In some cases, the text 526 and 528 may be positioned adjacent a cluster or node icon to which the text pertains.

In some cases, the adjacent text 526 or 528 may be positioned in a sub-segment quadrant corresponding to the quadrant in which the respective icon is found in the field-of-view 502. For example, the text 526 and 528 may be positioned and an upper left quadrant 530 of the respective cluster to which the text pertains, with text 526 corresponding to the node having the sub segment lines 532 and 534, and the text 528 corresponding to a different cluster icon lower and to the right of that cluster icon. In some cases, cluster text 526 and 528 may be positioned according to a force directed layout while being constrained to the particular quadrant of a sub-segment. In some cases, the arrangement of the sub-segment boundaries 532 and 534 may be the same as the arrangement of the segment boundaries 520 and 522 except with a different center point aligned to the icon to which the text pertains. For example, the sub-segment boundaries 532 and 534 may have a center point 536 corresponding to a centroid or center of an icon to which the respective text pertains.

As illustrated, text labels in other segments, such as segment 518, segment 514, and segment 516 may be positioned in different sub-segment quadrants of the icon to which the text pertains. For example, text label 538 may be positioned in a lower left sub-segment, or quadrant 540, because the corresponding cluster icon is in the lower left quadrant 518. Similarly, text label 542 may be positioned in an upper right sub-segment, or quadrant 544, because the corresponding cluster icon is in the upper right segment 514. Following this pattern, the text label 546 may be positioned in the lower right sub-segment, or quadrant 548, because the corresponding cluster icon is in the lower light segment 516. Thus, in some cases, the segment of the field-of-view in which an icon is dispose may determine the sub-segment around the respective icon in which the text is positioned, for instance with the text tending to be disposed away from a center point of the field-of-view 502, thereby automatically arranging the text in a relatively distributed fashion that makes better use of the space available on the field-of-view 502 than some traditional techniques.

Further, this process may be accomplished without human intervention in some cases. In some use cases, an analyst may cycle through several dozen graphical visualizations, some of which may be generated only once, during a session, and manually positioning text labels is not expected to be feasible for these use cases (which is not to imply that a user cannot adjust text labels manually in some embodiments).

In some cases, the segmentation of the field-of-view 502 is different from the segmentation of the sub-segments around the respective icons. For example, as noted, some embodiments may segment the field-of-view 502 with a k-means clustering algorithm, to form segment boundaries around the diagram. In some cases, segment areas may be Voroni diagrams segments, and sub-segments may be formed with a division like that illustrated by lines 532 and 534, for instance dividing the segments of the Voroni diagram into quadrants, for instance centered around a respective icon.

In some cases, each item of text may be associated with a value indicating that the text is to be displayed, a value indicating a horizontal position in the field-of-view 502 (like a number of pixels from a left-most axis), and a value indicating a vertical position in the field-of-view 502 (like a value indicating a number of pixels from a top axis). In some embodiments, a determination be made as to which text to present based on scores associated with the text indicating the significance of the text, like those described above. For example, some embodiments may determine to display text labels having greater than a threshold significance. In some embodiments, visual attributes of the text labels may be modulated based on significance scores, for instance increasing a visual weight of the text labels, like with a larger font, bolding, a different color, adjustments to saturation, drop shadow, vibrations, transparency, and the like. In some cases, these thresholds may be dynamically adjusted, for instance by normalizing the significance scores for the candidate text labels.

Figure 5:
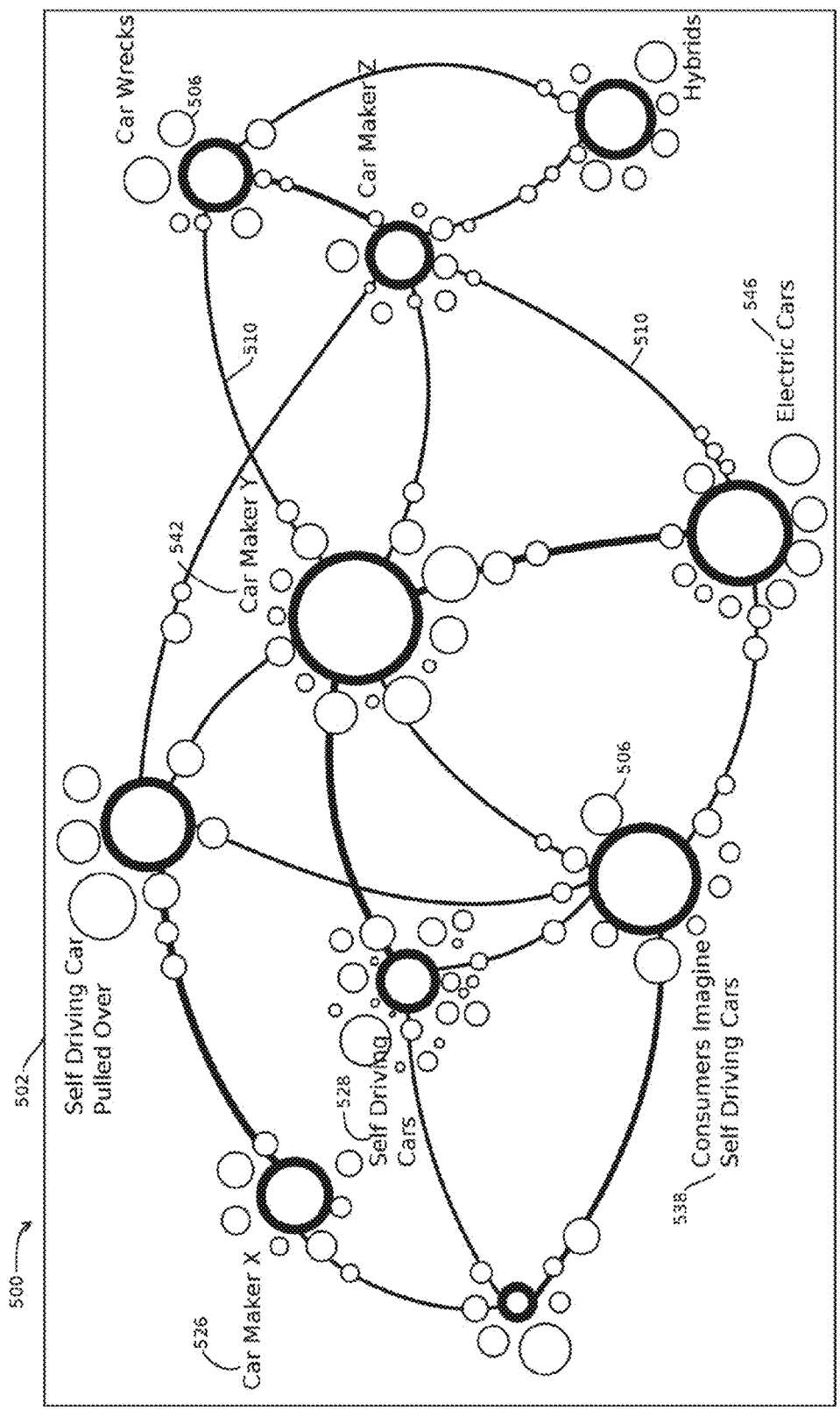
FIG. 5 illustrates the segmented visual representation of FIG. 3 following application of text labels without sub-segments depicted.

Next, some embodiments may cause the visual representation to be displayed, as indicated by block 524. In some cases, causing the visual representation to be displayed may be accomplished by sending instructions to a remote client computing device to display the graphical representation, for instance along with positions of text labels to be displayed. An example of a resulting graphical visualization is shown in FIG. 5. As illustrated, the text labels 526, 528, 538, 542, 546 and other text labels are positioned such that the text is relatively easy to read and is relatively distinct from other text in the field-of-view 502. Further, as illustrated, the text labels are dispose radially away from a center of the field-of-view 502 relative to their respective associated icons.

In some cases, some text labels may be conditionally revealed upon a user selecting a particular icon, like touching on the icon clicking on the icon, hovering over the icon, or looking at the icon in a virtual reality display, for instance for more than a threshold duration of time. In some cases, the conditionally displayed text may be cached on the client side for faster responses, along with corresponding event handlers and positioning values for the text determined with the techniques described above. In some cases, the corresponding text may be displayed of in response to an event handler on the client side handling a corresponding event indicating a user selection of the corresponding icon.

In FIGS. 2-6, a single cluster icon may represent a plurality of nodes in a document. Other embodiments may not group the nodes in this fashion to providing more detailed information.

Figure 7:
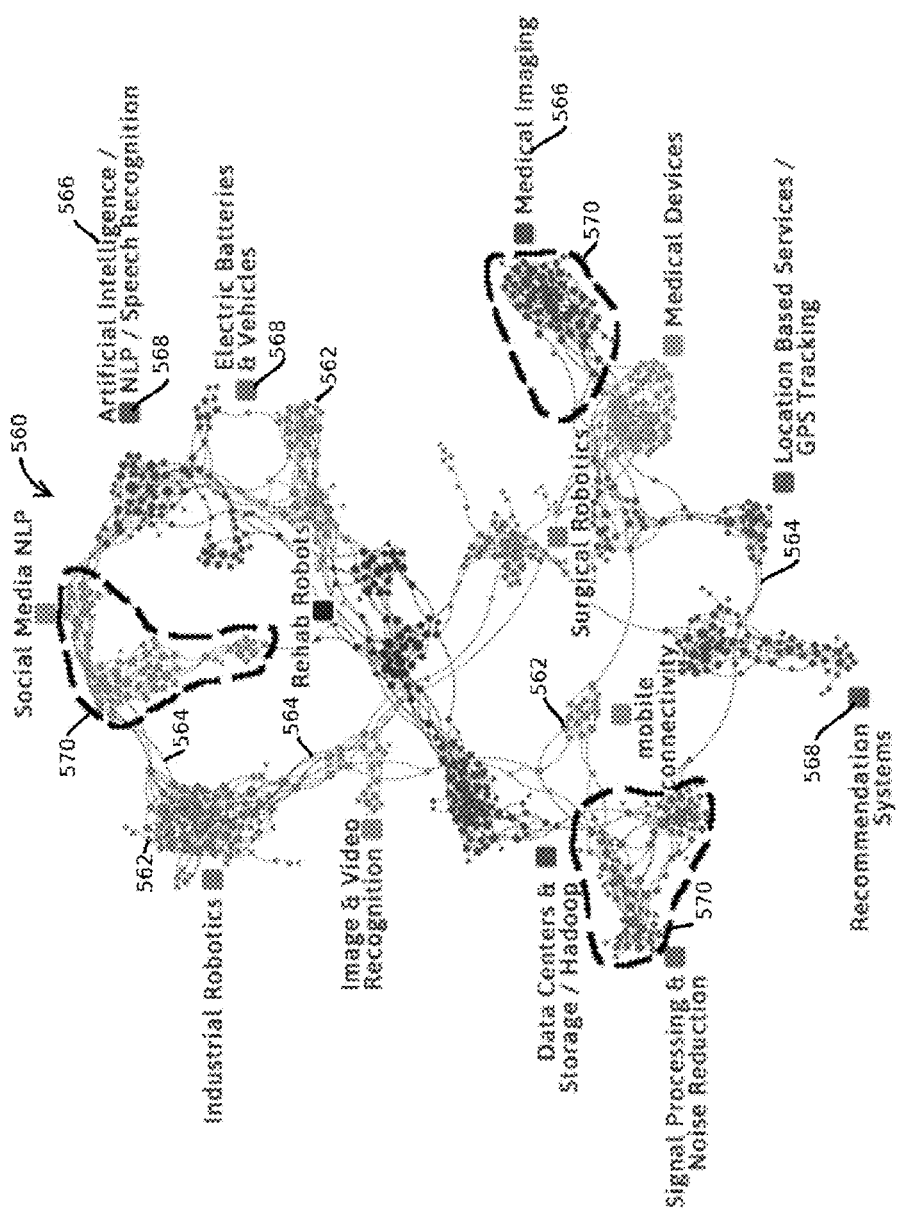
FIG. 7 illustrates an example of a visual representation that may be augmented with the process of FIG. 1.

FIG. 7 is another visual representation of a graph data structure 560 in accordance with the present techniques. The illustrated visual representation 560 is a two-dimensional visual representation, such as made be displayed in a user interface, like within a window of a web browser. While this view is 2D, the present techniques are consistent with higher dimensional visual representations, for example, three-dimensional visual representations presented within a virtual reality or augmented reality environment, like within a head tracking display.

In this example, the visual representation 560 includes a plurality of nodes 562 connected by links 564. In some embodiments, the nodes 562 represent documents, such as individual documents, or segments of documents, and the links 564 represent edges in a document relationship graph in which the edges indicate relationships between the documents, examples of which are described elsewhere in this document.

In this example visual representation 560, each node 562 is depicted individually by a representative icon, in this example, a circle. In some embodiments, the position of the icons relative to one another may be determined according to a force directed layout, consistent with the techniques described elsewhere in this document. In the resulting layout, the icons representing nodes 562 that are similar to one another in some sense, or otherwise exhibit a relatively strong relationship, may be positioned relatively close to one another within the visual representation 560, thereby producing irregularly shaped collections 570 of those icons representing nodes 562 within the visual representation 560. In some cases, these collections 570 of nodes may correspond to the above-described clusters, or in some cases, multiple, somewhat related clusters may be grouped together within a collection 570 of nodes positioned near one another. Collections may be determined with the clustering techniques described herein, in some cases with looser parameters for density.

In some embodiments, each of these collections of nodes may have associated text labels 566, for instance, generated according to the techniques described above for generating text labels. In some cases, the text labels 566 may have an associated anchor icon 568, and in example illustrated as a square. In some embodiments, the anchor icon 568 may have a visual attribute, like color or one of the other example visual attributes described above, that is shared by icons representing nodes 562 corresponding to text label 566 of the anchor icon 568. In some embodiments, the text labels 566 are the categories or topics (which is not to imply that a topic cannot be a category, or vice versa) exhibited by the collection of nodes associated with the text label 566 and anchor icon 568. In some embodiments, the text labels 566 or the anchor icons 568 may be user selectable in the visual representation, such that in response to receiving a user selection, like a click or on-touch event, some embodiments may retrieve and display within the visual representation 560 additional information about the nodes in the collection represented by the text label 566, like a number of nodes, a strength of the correspondence to the text label, statistics about the nodes, attributes that caused the text label to be applied, and the like.

As illustrated, the anchor icons 568 and the text labels 566 may be positioned with in the visual representation 560 relative to the collection of nodes 570 that are represented by those items 566 and 568 in a manner consistent with the techniques described above. In this example, the anchor icons 568 and text labels 566 may be positioned according to the quadrant within which the collection of nodes that are represented is disposed, with those having a collection of nodes dispose within some threshold distance of the center vertical portion being centered above the corresponding collection of nodes 570. Embodiments may execute a variety of different routines to assign a collection of nodes to a quadrant or other segment of the field of view. Some embodiments may assign the collection of nodes according to a centroid of the collection of nodes 570, or some embodiments may determine which segment of the field of view of the visual representation 560 has the most icons representing notes 562 disposed therein. Some embodiments may determine a convex hull of the collection of nodes 570 within the visual representation 560, and assign collections of nodes 570 to segments based on a centroid of the convex hull being within the respective segment or based on greater than a threshold amount of an area of the convex hull being within the segment.

As illustrated, the present techniques may be even more effective in high-information density displays like FIG. 7, where a relatively large number of icons are displayed. In some cases, text labels 566 and anchor icons 568 may be positioned by determining a convex hull of the collection and then minimizing a distance in the visual representation between the items 566/586 and the centroid of the convex hull, while restricting items 566/568 to a segment of the area around the collection 570 (e.g., a quadrant, like described above).

In some embodiments, a centroid of a cluster may be determined, e.g., a weighted average (or other measure of central tendency) of all node positions within a cluster. Some embodiments may use various node properties as a weight for the nodes, e.g., metadata like share counts, topic scores, view sentiment scores, and the like, or some embodiments may weigh the nodes equally.

Some embodiments may determine a convex hull of the cluster. In some cases, a smallest radius (or other area, like a box) that includes more than a threshold amount of the cluster may be determined as an approximated bounding area. In another example, a convex hull algorithm may determine the bounding area. For instance, the bounding area may be determined with a Jarvis march algorithm, a Graham scan, a Quickhull algorithm, a Divide and conquer algorithm, a Monotone chain algorithm, an Incremental convex hull algorithm, Chan's algorithm, or the like. In some cases, bounding areas may be determined based on angles between the nodes in visual representation space. Some embodiments may select a node, such as the lower and left-most node, and then determine an angle formed by that node and each of the other nodes in the cluster. The nodes may then be sorted according to this angle. Embodiments may then iterate through the sorted sequence to determine whether a line between the two node preceding a given iteration indicate a left turn or a right turn. Upon determining that a left turn has incurred, the line between the nodes may be designated as indicating a portion of the convex hull. Or in another example, an embodiment may select the lower-left-most node in visual representation space among the nodes, determine the angle between that node and each of the other nodes, and select a largest or smallest angle as indicating a portion of the convex hull. Embodiments may then proceed along that angled line to the other node and repeat the process, wrapping around the convex hull, until the first node is encountered. Some embodiments may produce a set of vertices in visual representation space (e.g., pixel coordinates of a display window) corresponding to coordinates that encompass the cluster. Or some embodiments may identify as the bounding area the area having greater than a threshold density and being adjacent. In some cases, nodes may be characterized probabilistically in the visual representation space, rather than having a binary threshold boundary, e.g., using the techniques described in a paper titled Convex Hulls under Uncertainty, by Pankaj K. Agarwal, Sariel Har-Peled, Subhash Suri, Hakan Yildiz, and Wuzhou Zhang. In some cases, the probability may serve as a weight when calculating a centroid.

Some embodiments may then determine a "spoke," or ray starting from an origin and pointing to a centroid of the cluster, intersecting the convex hull of the cluster at exactly 2 points: Point A, the intersection closer to origin; and Point B, the intersection further away from the origin. In some cases, the origin may be a center point in visual representation space, or a centroid for an entire graph (e.g., with multiple clusters). The anchor position may then be computed as a point on the Spoke, at a distance D away from Point B. This distance D may be the same in each case (e.g., 10 pixels in visual representation space) or computed from an algorithm that takes into consideration the distance between Point A and Point B, where the centroid of the cluster sits relatively to Point A and Point B and, in some cases, other factors.

A variety of different types of spaces are described herein. It is important to keep in mind the difference between a vector space by which documents (or other entities) are determined to have relationships, such as semantic similarity, and a visual representation space in which a visual representation is displayed. The visual representation space has dimensions corresponding to visual attributes of the appearance of a particular view of the graph, while the vector space has dimensions corresponding to attributes of the underlying entities, like documents, that the graph represents. For example, a single graph within a vector space has multiple different visual representations and different visual representation spaces, in which the dimensions of the visual representation spaces represent different visual attributes.

Figure 8:
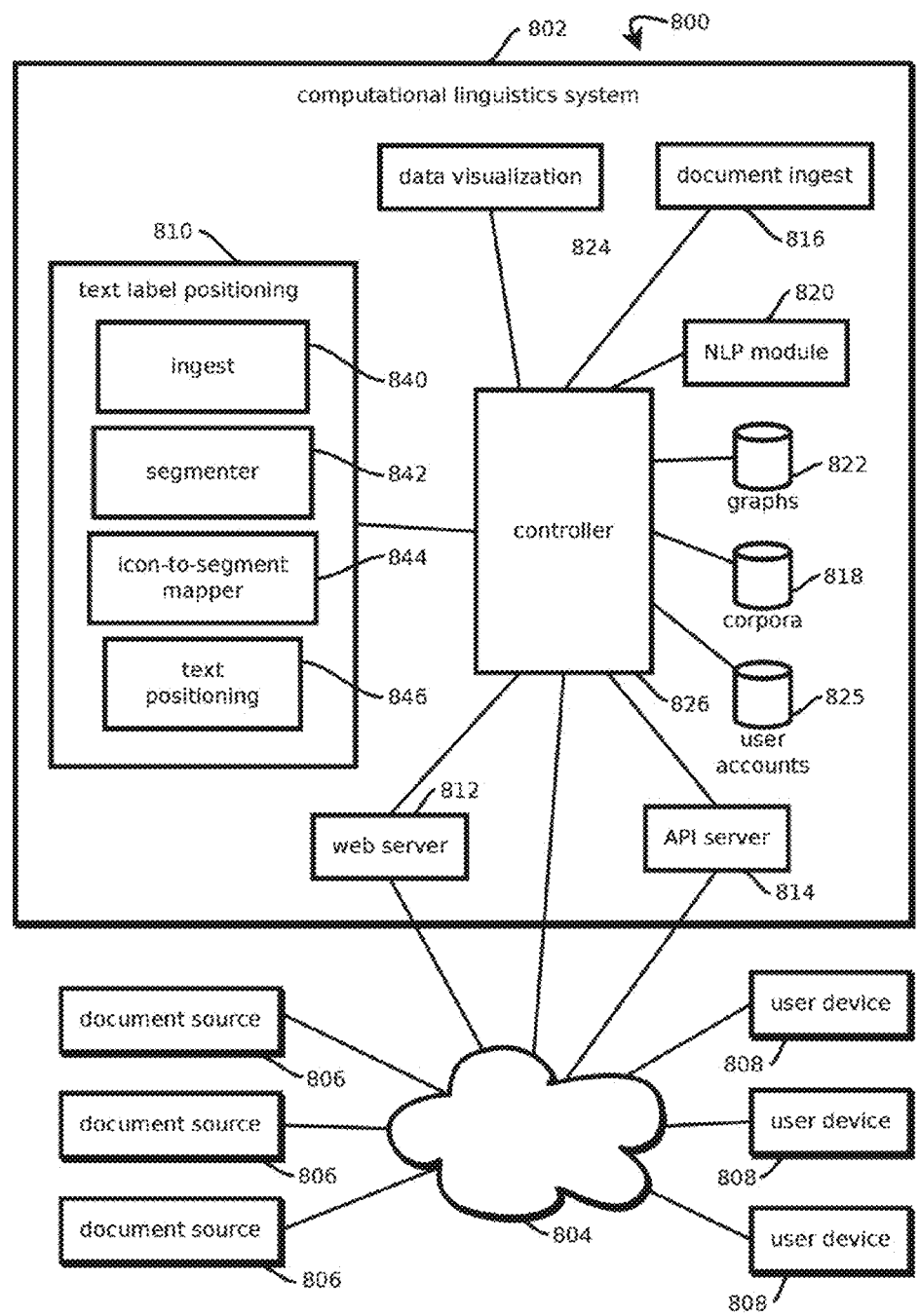
FIG. 8 illustrates an example of a computational linguistics system that may perform the process of FIG. 1.

FIG. 8 illustrates, in block diagram form, the logical architecture of an example of a computing environment 800 in which the above-described techniques may be implemented. In some embodiments, many (and in some cases, most) queries and other analyses are expected to return information about relatively large collections of documents (e.g., more than 1,000, and in many cases, more than 10,000, or more than 100,000). This is the intended use case of some embodiments, which is distinct from many online search engines designed to designate the most relevant document. In view of this distinction, some embodiments of process the results and provide graphical user interfaces that facilitate insights on collections of responsive documents, rather than merely directing the user to individual documents. In many cases, users are more interested in what an entire field has to say about a particular topic, rather than finding, for instance, the most relevant individual document about some topic. Many traditional search engines are not well-suited for this type of analysis, as it is common for search engines to emphasize individual responsive documents rather than attempt to provide some synthesis of the collection of responsive documents. In contrast, some embodiments consistent with the present techniques may both help the user find the needle in the haystack, as well as develop an understanding of the haystack itself.

In some embodiments, environment 800 includes a computational linguistics system 802, the Internet 804, document sources 806, and a plurality of user devices 808, such as personal computers, laptops, or mobile devices having the features of the below-described computer systems. Representative devices are shown, but it should be understood that substantially more devices and instances may be used in commercial embodiments, e.g., more than 100, or more than 1,000 user devices, and more than 10, or more than 100 document sources.

In this example, subscribing users may submit commands (like specifying corpora and topics) to the system 802 (which may be geographically remote) via a web browser executing on user devices 808 and exchanges over the Internet 804. In some embodiments, users may submit commands to view (or otherwise interrogate, e.g., search) trends, entity relationships, sentiment relationships, term relationships, or document relationships (e.g., graphs of such relationships) determined by the computational linguistics system 802 based on unstructured plain text documents. These documents, in some cases, may be retrieved (e.g., downloaded) from content hosted by third party document sources 806, in some cases as batch downloads in advance of queries.

In some embodiments, the computational linguistics system 802 may include a text label positioning module 810 to perform the above-described techniques, a web server 812, an application-program interface (API) server 814, a document-ingest module 816, a corpora repository 818, a natural-language processing module 820, a graph repository 822, a data visualization module 824, a user-account repository 825, and a controller 826. The controller 826 may coordinate the described operations of the other modules. In some cases, prior to granting access, the controller 826 may confirm a user's credentials against a user account in the repository 825 for security purposes and to verify whether a user account is current, e.g., a subscription fee has been paid.

In some embodiments, the computational linguistics system 802 includes a text label positioning module 810. In some embodiments, the module 810 performs the process 10 of FIG. 1 described above. In some embodiments, the module includes an ingest module 840 that performs block 12 of FIG. 1. In some embodiments, the module 810 includes a segmenter 842 that performs the operation of block 18 described above with reference to FIG. 1. In some embodiments, the system further includes an icon-to-segment mapper 844 that performs the operations of block 20 of FIG. 1. Finally, in some embodiments, the module 810 includes a text positioning module 846 that performs the operation of block 22 of FIG. 1.

In some embodiments, system 802 may include a web server 812 and an application-program interface (API) server 814. These servers may listen to corresponding network ports, maintain session state for various sessions with user devices 808, advance requests and posted data to controller 826, and send responsive data to user devices 808. In some cases, responses may be in the form of web pages, like serialized bodies of markup language, cascading style sheets, and JavaScript™ instructions used by web browsers to render content, like inputs for making requests or data visualizations of query responses. In some embodiments, the API server 814 may be operative to send structured responsive data, like XML or JSON formatted responses to queries and receive machine-generated requests. In some embodiments, the servers may be blocking servers, or the servers may use various techniques to process multiple requests concurrently, e.g., with various asynchronous programming techniques, like by tracking and implementing deferreds or promises.

In some embodiments, the document-ingest module 816 may obtain collections of documents and store those documents in corpora repository 818, which may have analyzed corpora of unstructured plain text documents used to generate the presently described graphs. In some embodiments, the documents may be obtained from different document sources 806, such as remote, third-party repositories of documents, like web servers.

In some embodiments, retrieved and stored corpora are collections of unstructured text documents. In some embodiments, the unstructured text may be included within structured portions of other documents, for example, rendered text within markup instructions in a webpage, or unstructured text embedded in a serialized data format, like paragraphs within an extensible markup language document or JavaScript™ object notation document. This surrounding structure notwithstanding, in some embodiments, at least some, and in some cases most or only, the text analyzed in constructing graph topologies is unstructured text, like human readable plain text in prose form with markup instructions and scripting language instructions removed. For instance, an automated web browser, like Selenium™, may be executed to retrieve web pages, execute scripts to and render markup language construct a document object model of the webpages, and parse visible text from the web pages that is retrievable from ".text" attribute of a DOM object containing the text. Removing the computer-readable portion is expected to cause documents to be grouped according to their content intended to be read by humans, rather than according to the programming library or practices invoked by a developer. Or some embodiments may leave this markup language and scripting instructions in place to analyzed documents according to their mode of construction or to weight terms according to their visual weight when rendered or annotate terms according to their context. In some embodiments, the text may be encoded as Unicode or ASCII text.

In some cases, an analyzed corpus may be relatively large, for example, more than 100 documents, more than 1,000 documents, or more than 10,000 documents, and connections indicating semantic similarity between the documents (or entities, sentiments, terms, or the like, as described below) may be relatively numerous, e.g., more than 5 connections on average between documents, like more than 50, more than 500, or between each unique pair of documents. In some embodiments, each of the documents may also include a substantial amount of text, for instance, more than 100 words, more than 500 words, or more than 2,000 words.

In some embodiments, an analyzed corpus used to construct a graph may be relatively large. For expected use cases of the present inventions, the corpus is larger than would be economically feasible for humans to manually perform the process 10 in reasonable amounts of time, and computers are required to implement the process 10 in commercially relevant intended applications. For example, the corpus may include more than 50 documents, like more than 500, or more than 5,000 documents. Further, in some embodiments, the documents within the corpus may be relatively long, for example, having a median length of more than 50 words, like more than 500 or more than 5,000 words, depending upon the use case.

The necessity of computer implementation, even for relatively small corpora, can arise from the number of documents, the length of documents, or the semantic pairwise interrelationships between the documents, which can give rise to data structures that can grow factorially with each additional document depending upon how aggressively semantic links between documents are pruned. Due to this scaling effect, each additional document in some applications can impose substantial additional computational and memory burdens, and increasing the number of documents even by a small amount can be a nontrivial problem, particularly without the benefit of some of the techniques described herein to expedite computer processing of the analysis and conserve limited memory within a computer system.

In some embodiments, the documents within the corpus may be related in some fashion, for example, all from the same source or related to a category of topics, entities, sentiments, or the like. Examples of corpora include academic literature, like scientific literature, medical literature, economic literature, psychological-research literature, and the like, for instance, from a given journal, university, country, or academic. Other examples include webpages, for example, from businesses, like the 500 highest ranking business entity websites responsive to a given query, businesses within a given region, business in a given industry, businesses at a given state of development (like emerging businesses), or combinations thereof, like startups in Silicon Valley targeting the shipping industry to give one example. Other examples of corpora include documents hosted in government databases, like the full text patent database hosted by the United States Patent Office, regulatory filings with the Securities and Exchange Commission hosted in the Edgar database, court filings within the Pacer database, Federal Communication Commission filings, United States Food and Drug Administration filings, and the like. Another example of corpora includes various bodies of journalism, like catalogs of newspapers, magazines, and the like. Relevant corpora also include social media posts, for example, microblog posts, blog posts, posts within social networks, and the like, as well as resumes, job postings, and product manuals. Some embodiments may operate on corpa of unrelated documents, such as any corpus containing metadata that could be represented as discrete data points or ranges.

In some cases, the corpus is obtained by processing non-text documents, for example, by performing optical character recognition on image-formatted documents or by submitting photographs to image recognition and description algorithms that return a prose description of photographs. In some cases, the corpus may be obtained without metadata indicating the semantic relationships between documents within the corpus, and these relationships may be discerned, for example, with software provided by Quid of San Francisco Calif., or by performing latent semantic analysis or other distributional semantic techniques to construct the graphs described herein. In some cases, the analysis may be performed by an unsupervised machine learning technique, or some embodiments may train supervised machine learning models (e.g., with stochastic gradient descent) based on a training set, like text data having manually-labeled features. Unsupervised methods are expected to be less expensive and more broadly applicable, as the cost and complexity of feature engineering may be reduced relative to supervised techniques, which is not to suggest that at least some embodiments are not also consistent with supervised learning.

In some embodiments, the natural-language processing module 820 may analyze these corpora and store resulting graphs in the graph repository 822, e.g., at query time or in advance, depending on acceptable latency and resources available, or in some cases partially in advance. In some cases, graphs like those described above may be obtained by subjecting a corpus to various types of distributional semantic analysis, e.g., statistical similarities measures like latent semantic analysis, random indexing, normalized Google™ distance, Best path Length On a Semantic Self-Organizing Map, Vector Generation of an Explicitly-defined Multidimensional Semantic Space, or other techniques by which the distribution of terms in documents is represented as relatively high-dimensional vectors, and semantic similarity is measured by according to similarity of the vectors, for instance, cosine similarity or Minkowski distance. The analysis technique used by some embodiments may be selected based on the type of relationships to be measured, e.g., between entities or terms, versus between larger units of language, like documents or paragraphs. In some cases, a corpus may be analyzed multiple ways, yielding graphs of relationships between entities mentioned in the documents as well as graphs of relationships between the documents.

Graphs need not be labeled as a "graph" in program code to constitute a graph. Other constructs may be used to the same ends and still constitute a graph. It is enough that the arrangement of information (e.g., in program state, storage, or both) contain the attributes of the presently described graphs to constitute a graph having edges and nodes. For example, in an object-oriented programming environment, documents may be mapped to "document" objects, and those objects may have an attribute of a list of semantically similar documents each of which corresponds to a different "document" object and has a similar list referencing other documents, regardless of whether this arrangement is referred to as a "graph" in code.

In some embodiments, to measure relationships between documents (or other larger language units, like paragraphs), each document may be represented by a feature vector in which each value of the vector indicates the presence, number of occurrences, or frequency of an n-gram in the document. N-grams are sequences of one or more terms, e.g., "the" is an example of an n-gram where n=1, "the quick" is another n-gram where n=2, and "the quick brown fox jumped" is another where n=5. In some cases, relatively uninformative terms, like stop words ("the," "a," and "an" being common examples), or terms detected with term-frequency inverse document frequency (TF-IDF) scoring may be omitted.

To calculate TF-IDF for a given n-gram, some embodiments may count the number of times the n-gram occurs within a given document and the number of other n-grams in the document before calculating a frequency with which the term occurs within the document. Some embodiments may also count the number of times the n-gram occurs in a larger collection of documents, such as the analyzed corpus of a sampling thereof, as well as the total number of terms in the larger collection of documents to calculate another frequency with which the term appears in the larger collection of documents. The two resulting frequencies may be compared, for instance, dividing one frequency by the other, to determine the TF-IDF score.

In some embodiments, a form of TF IDF may be calculated that suppresses the marginal effect of relatively high counts of n-grams within documents, for instance with a BM25 score. In some embodiments, the amount (e.g., count or frequency) of occurrences of the respective n-gram in a given document may occur both in a numerator and the denominator of a ratio with the amount of occurrences of the respective n-gram in the larger sample of other documents, for instance as a sum between these values in the denominator and the document-frequency in the numerator. In some embodiments, these values may have a derivative with respect to the amount of occurrences in the respective document that decreases in absolute value as the number of occurrences in the respective document increases, for instance monotonically or substantially monotonically. Thus, in some embodiments, the values may be proportionate or not proportionate to the amount of occurrences of the respective n-gram in the respective document. Suppressing the effect of higher occurrence amounts in the document at issue is expected to yield results closer to the user's intent, though embodiments are consistent with other (e.g., proportional) approaches.

Position of a value in the feature vector may correspond to one n-gram, e.g., the first position of a vector may correspond to the n-gram "jumped over," and documents containing this sequence of terms have a feature vector with value in the first position indicating that this term is present. Documents many be analyzed as a whole, or at higher resolution. For instance, in some embodiments, each document may be partitioned into paragraphs, and then, a feature vector may be constructed for each paragraph, with values of the vector corresponding to the presence of n-grams within the respective paragraph. Vectors need not be labeled as "vectors" in program code to constitute vectors, e.g., ordered lists may constitute a vector in some cases.

Because the universe of n-grams a document could contain is relatively large, and documents tend to use a relatively small portion of these n-grams, feature vectors tend to be relatively high-dimensional and sparse, having a value of zero for most values. To mitigate the burden of high-dimensionality, in some cases, feature vectors may be subjected by some embodiments to various types of dimensional reduction, like indexing, random indexing, or singular value decomposition.

In some cases, a corpus may be represented by arranging the feature vectors into a term-document matrix. For instance, each row or column may correspond to a document, and the values along the row or column may be the feature vector of that document. Thus, rows may represent documents, and columns n-gams, or vice versa.

Or in some embodiments, a document or corpus may be represented as a co-occurrence matrix, where both rows and columns represent n-grams, and values indicate the presence, number, or frequency of instances in which corresponding n-grams occur within a threshold distance of one another in the text. In some embodiments, co-occurrence matrices for documents may be appended to one another to represent a corpus in a higher-dimensional matrix, e.g., in a three dimensional corpus matrix, with each two-dimensional co-occurrence matrix corresponding to a document. Such matrices may be reduced in dimension with a number of techniques, including random indexing. Matrices need not be labeled as a "matrix" in program code to constitute a matrix, e.g., an ordered list of ordered lists may constitute a matrix.

In some cases, a variety of types of relationships may be processed with some embodiments. For instance, semantic similarity or relatedness of entitles mentioned in documents, sentiments expressed in documents, or terminology in documents may be determined with computational natural language processing of unstructured plain text corpora. In some embodiments, a corresponding graph may be constructed, with documents, paragraphs, entities, sentiments, or terms as nodes, and weighted edges indicating relationships, like similarity, relatedness, species-genus relationships, synonym relationships, possession relationships, relationships in which one node acts on another node, relationships in which one node is an attribute of another, and the like. In some cases, the edges may be weighted and directed, e.g., where the relationship applies in one direction and can vary in magnitude or certainty.

Analyses of such matrices may entail operations like insertion, multiplication, and addition. As noted above, in some embodiments, matrix operations may be prohibitively slow or memory intensive for a larger datasets. A number of techniques may be used to expedite these operations and reduce memory consumption. In some embodiments, to expedite operations, matrix operations may be performed in a single instance of a computer system, for example, within a single memory address space of a single operating system, and in some cases, by holding some or all of the matrix data in program state concurrently to avoid disk access or network access latency penalties. Or, some embodiments may distribute operations on additional computing systems, which is not to imply that any other feature described herein may not also be omitted. In some embodiments, the computer system may be configured with a relatively large amount of random access memory and on-chip cash memory to these ends.

In some cases, some of the sparse-matrices described above may consume a relatively large amount of memory using some traditional techniques. To conserve memory, some embodiments may compress the sparse matrices, for example, by decomposing a matrix into vectors, and translating the vectors into an index indicating which vector scalars have a nonzero value and corresponding indications of those values. Some embodiments may compress such vectors with run-length coding of values of those values that are zero. Some examples may compress sparse matrices as a dictionary of key, a list of lists, a coordinate list, a compressed sparse row, or a compressed sparse column. In some cases, such matrices, or portions of sparse matrices, may be expanded for some vector operations and then re-compressed after and before, respectively, the sparse matrices, or portions thereof, are moved upward in a memory hierarchy towards a processor.

Various encodings may be selected to improve the functioning of a computer system. In some cases, values of matrices, like weights, may be normalized, for example, ranging between zero and one or as eight, 16, or 32 bit binary values having a number of digits selected in view of an operating system, register size, memory bust size, and other hardware constraints of a computer system upon which the above processes are to be run to expedite operations and conserve memory.

Some embodiments may determine document similarity based on latent semantic analysis of unstructured text in the documents. For instance, some embodiments may create a term document matrix of the documents. Then, the term-document matrix may be transformed with singular value decomposition (SVD) to map documents to concepts expressed by the terms. Documents having similar concepts may be deemed similar, e.g., based on similarity of concept vectors for the documents yielded by SVD. In some cases, terms appearing with more than a threshold frequency in the documents may be determined and weighted according to TF-IDF. In some cases, the resulting weighted term document matrix may be decomposed by determining two vectors, that when multiplied, approximate the matrix. In some embodiments, error between the approximation and the matrix may be determined, and the error may be decomposed by determining two more vectors that when multiplied approximate the matrix of errors. This process may be repeated until an aggregate error is determined to be smaller than a threshold. A threshold number (e.g., the second and third) of the resulting vectors may correspond to dimensions in a concept space, where the concepts that emerge correspond to co-occurrence of terms in documents indicated by clusters in the space. Documents may be clustered according to their corresponding vectors in the concept space, or similarity of documents may be determined by some embodiments by comparing their respective vectors in this space, e.g., based on cosine similarity or other measures.

In some cases, high dimensional sparse vectors may be reduced in dimension with random indexing. For instance, document text may be represented in a co-occurrence matrix, where rows represent n-grams, columns represent adjacent n-grams (like within a threshold number of words in the text), or vice versa, and values represent presence, number, or frequency of instances in which corresponding terms are determined to be adjacent one another in the text. In some cases, to reduce memory consumption of sparse vectors in such a semantic similarity analysis, a co-occurrence matrix may be created by representing adjacent n-grams as vectors that are smaller (e.g., substantially smaller) than the number of potential adjacent n-grams and are made generally distinguishable from one another by randomly (e.g., pseudo-randomly) assigning values, like 0, +1, or -1. As adjacent n-grams are encountered during parsing, corresponding rows or columns of n-grams in the co-occurrence matrix may be updated by summing current values of the row or column with corresponding values of the adjacent n-gram vector. Similarity of n-grams (and corresponding entities) may be determined based on similarity of resulting vectors in the co-occurrence matrix, e.g., based on cosine similarity.

In some cases, similarity (or other relationships) between larger language units may be determined. For instance, in some cases, a feature vectors may be determined for documents in a corpus. Some embodiments may execute a density-based clustering algorithm, like DBSCAN, to establish groups corresponding to the resulting clusters and exclude outliers. To cluster according to vectors, some embodiments may iterate through each of the vectors reflected in the records and designate a vector as a core location in vector space if at least a threshold number of the other vectors in the records are within a threshold distance in vector space. Some embodiments may then iterate through each of the vectors and create a graph of reachable vectors, where nodes on the graph are identified in response to non-core corresponding vectors being within a threshold distance of a core vector in the graph, and in response to core vector in the graph being reachable by other core vectors in the graph, where to vectors are reachable from one another if there is a path from one vector to the other vector where every link and the path is a core vector and is it within a threshold distance of one another. The set of nodes in each resulting graph, in some embodiments, may be designated as a cluster, and points excluded from the graphs may be designated as outliers that do not correspond to clusters.

In some cases, the graph may be a clustered graph in which collections of nodes are grouped into clusters according to various criteria, such as based on edges connecting the nodes. In some cases, clusters may be clustered according to a graph clustering algorithm, like a Markov cluster algorithm. Some embodiments may randomly walk the graph, e.g., with probabilities weighted according to edge weights, and record other nodes visited, in some cases including self-referential edges. Based on these random walks, some embodiments may form a transition probability matrix indicating the probability of traveling from one node to another. Some embodiments may normalize the transition probability matrix. Some embodiments may then iteratively expand the matrix by taking the eth power of the matrix and then inflate the matrix by taking the inflation of the resulting matrix according to a configurable parameter. Some embodiments may repeat these iteration until the matrix converges to reveal clusters according to positive values along rows of the converged matrix.

In some cases, when performing these operations, movements within a memory hierarchy of a computer system (e.g., from storage, to dynamic random access memory, to L3 cache, to L2 cache, to processor registers) may be relatively slow, and memory space may be particularly limited higher in the hierarchy, closer to the processor. For example, access to data stored in registers of a processor, such as a CPU or graphics processing unit, may be relatively fast, while the amount of available storage may be relatively low. Level 2 and level 3 cache, respectively, may offer trade-offs of increasing magnitude, exchanging slower access times for greater storage space. Similarly, dynamic random access memory may offer even greater storage, though access times may be several orders of magnitude slower than the registers or cache memory, and persistent system storage, such as a hard disk or solid-state drive) may extend this trade-off even further. In some embodiments, matrices may be large enough that during operation substantial portions of the matrix, for example, most of the matrix, cannot fit into the higher levels of a memory hierarchy, and portions of the matrix may be swapped in and out of the higher levels of memory hierarchy during operations on those portions. As a result, in some embodiments, movement of data between levels of the memory hierarchy may account for a substantial portion of the computing resources, e.g., time and memory, consumed by a matrix operation. As some use cases reach relatively large scales, this consumption of computing resources may become prohibitive.

In some embodiments a blocking algorithm may be executed during certain matrix operations, for example, when multiplying two dense matrices or a dense matrix by a sparse matrix, to improve the functioning of the computer system and reduce the amount of time spent shifting data back and forth between levels of a memory hierarchy. In some embodiments, upon initiating a matrix multiplication, one or both of the matrices may be subdivided into blocks (e.g., tiles), each having a plurality of contiguous values within the respective matrix within a plurality of a sequence of rows and columns, for instance, those values that are both in the first 8 columns and in the first 8 rows might constitute one tile. In some embodiments, tile size may be selected based on the amount of available memory at various levels of a memory hierarchy, such that a given tile can fit within a targeted level of the hierarchy, like the level 2 or level 3 cache. Next, some embodiments may iterate through the tiles, loading the tiles into a higher level of the memory hierarchy, and then performing operations with that tile. In some embodiments, a given tile, after being loaded into the higher level the memory hierarchy, may be applied to update each implicated value of a product matrix. In some cases, the values of the product matrix may be initially set to zero, and then those values may accumulate updates as tiles are loaded and processed, until all of the tiles have been processed, and the final value of the resultant matrix is known. In some cases, updating a given value may include summing an existing value with one or more products of values within a tile that has been loaded into the higher level of the memory hierarchy. References to higher and lower levels of memory hierarchy, rather than specific levels, are intended to indicate the applicability of this approach to different levels of the hierarchy, for example, the higher and lower levels may be level 2 cache and dynamic random access memory respectively or level 2 cache and level 3 cache respectively. In some cases, multiple levels of tiling may be performed, e.g., a tile loaded into cache may be sub-divided into register-sized sub-tiles. In some cases, some of the techniques for accelerating matrix or vector operations or conserving memory may be implemented by invoking appropriate sequences of commands in a basic linear algebra subroutine library, like level 1, 2, or 3 commands.

Some embodiments may learn a set of topics and n-grams pertaining to the respective topics, and label documents, collections of documents, and n-grams according to scores indicating a pertinence of the topic. In some embodiments, the number of topics may be relatively large, for example, more than 10 topics, and in many cases substantially more, like more than 50, more than 500, or more than 1,000 topics in relatively fine-grained analyses. In some embodiments, the topics may be arranged in a hierarchical taxonomy, for instance, with "health" at a top level, "heart health" and "lung health" at an intermediate level, and "heart attacks" and "hypertension" at a lower level of the former. In some embodiments, the topics may be labeled topics in the sense that each topic has a term that refers to the concept or set of concepts to which the topic pertains, like the topic name "health." In other embodiments, the topics are unlabeled, for instance, corresponding to a collection of concepts or a concept that are inferred to be distinct from other collections of concepts, but these concepts or collections of concepts may be unnamed (e.g., after topics are identified but before topics are labeled) beyond merely being recognized as distinct by some embodiments. For example, some unsupervised learning techniques may group or score keywords according to a specified number of topics, without labeling each of those topics.

In some embodiments, each topic may be associated with a set of n-grams, such as one, two, three, four or more consecutive words appearing in natural language text. For example, the phrase "quick brown fox jumped over the lazy dog" includes bi-grams of "quick brown," "brown fox," "fox jumped," and so on, as well as tri-grams like "quick brown fox," "brown fox jumped," and so on. Some embodiments may include n-grams up to some threshold, like 1 (for keywords), 2, 3, 4, or 5. In some embodiments, the n-grams may be obtained from the text of a set of documents for extracting topics. In some embodiments, the set of documents may be the corpus obtained, a subset of the corpus (e.g., a random sample deemed large enough to yield statistically significant results while expediting processing), an overlap with the corpus, or a different set of documents. In some embodiments, the n-grams may be each unique n-gram present in the set of documents, in some cases excluding stop words.

In some embodiments, each topic may have a topic-specific score associated with each of these n-grams, for instance, in the form of a topic vector, where dimensions of the vector corresponds to each of the topics, and where values of each of the dimensions indicate an amount by which the corresponding n-gram is predictive of the corresponding topic. For example, a topic vector for the topic of "basketball" may include a dimension corresponding to the n-gram of "backboard" and that n-gram's dimension in the vector may have a score of 0.95 indicating a relatively strong predictive value for inferring that the n-gram refers to the topic of "basketball." The same topic vector may include another dimension corresponding to the n-gram of "court," and the n-gram may have a score of 0.3, illustrating a much weaker predictive value, for instance, due to this n-gram being used in association with many other topics, like a court of law. Similarly, the same set of topics may include the topic of "law," and the n-gram of "court" may have a score for this topic that is higher, for instance 0.6, indicating that the conditional probability of "law" being exhibited when the n-gram of "court" is observed is higher than the conditional probability of "basketball" being exhibited when the same n-gram is observed.

Encoding the topic-specific scores of the n-grams in the form of a topic vector is expected to consume less memory than systems that explicitly record key-value pairs for each topic and each n-gram and reduce the amount of data shifted up and down a memory hierarchy in a computer system or between computer systems, thereby yielding faster computations, though embodiments are also consistent with these slower approaches. Some embodiments may encode the topic vectors as tuples. In some cases these scores, and the other scores described herein, may be encoded as binary values of some length selected based on a specification of an operating system or a central processing unit (CPU), such as an 8-bit value, a 32-bit value, or a 64-bit value, each corresponding to, for instance, an address space size of an operating system, a number of registers in a CPU, or a unit of memory that moves as a block between one level of memory hierarchy and another.

In some embodiments, to conserve memory, the set of n-grams associated with each topic may be pruned. For example, in some cases, n-grams having a topic-specific score that does not satisfy a threshold, for instance, is less than a threshold value (e.g., 0.7), may be omitted from the set of n-grams corresponding to the respective topic. In some cases, the correspondence of n-grams after pruning to topics may be indicated with a binary value of zero or one in a topic vector, with dimensions that satisfy the threshold being designated with a 1 and dimensions that do not being designated by a 0. In some cases these topic vectors are expected to be relatively sparse, and some of the techniques described below for expediting computing operations with sparse vectors may be employed to expedite computations.

In some cases, the topics, the set of n-grams, and the scores for those n-grams may be explicitly provided as an input, for instance, by a user configuring the system with hand-coded topic data. However, in many cases, users are seeking document relationship graphs because the users are seeking an understanding of a relatively large corpus and the topics therein. In many of these use cases, the user will not have on hand a defined topic set, nor will it be feasible for a user to accurately specify a topic set well calibrated for interrogating the corpus of documents.

In some embodiments, the set of topics, the set of n-grams corresponding to those topics, and topic specific scores for each of those n-grams may be inferred from a set of documents, like the corpus itself, a set with overlap with the corpus, or a different set of documents. In some cases, supervised learning may yield such a data set. For example, in some embodiments, a user may supply a training set of documents in which the documents have been labeled with the topics exhibited by the respective documents. In some embodiments, the labeling is relatively granular, with multiple topics appearing in the documents, and subsets of the documents labeled as pertaining to particular topics. For example, such labels may indicate a range of words in the document by word count, for instance, with a start word count and an end word count, and this range may be associated with an identifier of a topic and a score indicating a pertinence of the topic to the range of text (e.g., from 0 to 1). In other cases, the labeling may be less granular, and a single topic label may be applied to an entire document, or a collection of topic labels may be applied to an entire document, in some cases with a binary indication, or in other cases with a cardinal score indicating a pertinence of the respective topics to the respective document.

Based on this training set, for each topic, some embodiments may learn topic-specific scores for each n-gram, the scores indicating an amount that the corresponding n-gram predicts the corresponding topic. A variety of different techniques may be used to learn these topic-specific scores. In some embodiments, the result of learning may be a topic model (e.g., a mapping of topics to a set of n-grams, each n-gram having a topic-specific score indicating a conditional probability of the respective topic being exhibited upon observing the respective n-gram in a document) having parameters that indicate the topic-specific scores. In some embodiments, the topic model may be formed by arbitrarily assigning topic-specific scores to the n-grams, for instance by randomly, like pseudo-randomly, assigning such scores. Next, some embodiments may iteratively determine whether the model parameters agree with the labels in the training set and adjust the model parameters to increase an amount of agreement (or determine whether the model parameters disagree and adjust the model parameters to reduce an amount of disagreement). In some cases, these iterations may continue until an amount of change between iterations is less than a threshold or a threshold number of iterations have occurred. For instance, some embodiments may adjust the model parameters according to a stochastic gradient descent. In some embodiments, the topic-specific scores are determined with supervise learning, based on the training set, with a support vector machine. In some embodiments, the topic-specific scores are determined with supervise learning, based on the training set, with a Bayesian topic model.

In some embodiments, the topic-specific scores may be determined with unsupervised learning. In some cases, it can be relatively expensive and time-consuming to obtain the training set, or the available training sets may not be known to have the appropriate type of subject matter to yield topics relevant to the corpus at issue. In such scenarios, unsupervised learning may yield the set of topics, n-grams pertaining to the topics, and corresponding topic-specific scores without requiring a training set be provided.

Some embodiments may ascertain topics in documents, sets of n-grams (e.g., keywords, or bi-grams or tri-grams) pertaining to each topic, a score for each n-gram for each topic indicating how predictive the respective n-gram is of the topic, and an score for each topic for each document indicating an amount the topic is exhibited by the document. Some embodiments may perform this analysis with an unsupervised learning technique, e.g., without incurring the cost of obtaining a manually labeled training set of documents where humans tag text as pertaining to topics or supply topic-n-gram correspondence values.

For instance, some embodiments may execute a form of Latent Dirichlet Allocation. In some cases, a number of topics to be ascertained may be supplied, e.g., by a user indicating that 2, 3, 5, or 50 topics are to be ascertained. Next, some embodiments may arbitrarily (e.g., randomly, like pseudo-randomly) designate each n-gram in each document as pertaining to one of the topics. Then, some embodiments may iteratively adjust the designations to make n-grams that, within the set of documents, tend to co-occur in a document more likely to be designated with the same topic.

For example, some embodiments may, for each document, for each n-gram in the respective document, for each topic, determine 1) an amount (e.g., proportion relative to a total number of n-grams of the same length) of n-grams in the respective document designated as pertaining to the respective topic, and 2) an amount (e.g., proportion relative to all documents) of all instances of n-grams (e.g., of the same length as the respective n-gram) in all of the documents designating as pertaining to the respective topic. And then for the respective document and n-gram, some embodiments re-designate the respective n-gram as pertaining to a topic selected according to a probability of the topics.

The probability of the topics may be 1) the conditional probability of the respective topic being exhibited given the respective document multiplied by 2) the conditional probability of the respective n-gram occurring given that the respective topic is exhibited (as indicated by the current distribution of assignments). In some embodiments, this operation may be repeated until the designations converge, e.g., until less than a threshold amount of designations change, or a sum or measure of central tendency of the second conditional probability changes by less than a threshold amount, or until a threshold number of iterations have occurred.

In some embodiments, for larger document sets, or larger documents, the operations may be relatively computationally complex and resource intensive. Accordingly, some embodiments may perform the analysis in a distributed computing framework, like Apache Hadoop or Spark, e.g., with documents or portions of documents being assigned to different nodes (e.g., computing devices or threads), and each node determining document-specific values (e.g., counts of n-grams or topic-pertinence, etc.), before the document-specific values are aggregated, e.g., to determine conditional probabilities for a population of documents. In some cases, some tasks may be assigned to nodes by document (e.g., sending each node a subset of documents), while other tasks may be assigned to nodes by topic (e.g., sending each node a subset of topics). In some cases, the number of nodes may be relatively large, e.g., exceeding 10, or 100 nodes. Sending instructions to the distributed data, rather than moving data between computing devices where instructions are static, is expected to yield faster results for particularly large data sets. Or some embodiments may perform these operations in a single thread or a single computing device.

Some embodiments may account for changes in topic associations with n-grams over time. In some cases, a plurality of sets of n-grams pertaining to a given topic may be determined, with each instance in the plurality being determined based on a different set of documents, each set of documents being associated with a duration of time, such as continuous ranges of time, like by year. In some cases, a user may select a particular time range for a particular topic or set of topics, and the corresponding time-range specific topic vectors may be selected for subsequent processing.

Some embodiments may learn multiple sets of topics, with each instance corresponding to a different granularity of topics. For instance, some embodiments may execute one of the above-described unsupervised techniques for learning a topic model with a first number of topics, like five, to yield a first set of topics and n-grams pertaining to the respective topics, and then execute the same technique with a different number of topics, like 50, to yield a second set of topics and n-grams pertaining to those respective topics, with greater granularity. Some embodiments may provide a user interface by which a user may select a granularity before selecting a topic, and corresponding topic vectors may be determined in response to the user selection.

In some embodiments, whether the topics and associated values are obtained with supervise learning, unsupervised learning, or explicitly provided, each topic may be specified by a topic vector, and the collection of topic vectors may form a topic matrix, with one dimension corresponding to topics (e.g., columns of the matrix), another dimension corresponding to n-grams (e.g., rows of the matrix, or vice versa). In some embodiments, the topic-specific scores may be normalized across topics. For instance, some n-grams may be relatively common generally and have a high correspondence with each of the topics, in which case, some embodiments may reduce an amount by which the corresponding n-grams are indicated to predict the topics relative to n-grams that have relatively isolated correspondence to relatively few topics. In some cases, such normalization may emerge in the process of learning topic-specific scores, or some embodiments may impose such normalization, for instance, by dividing each topic-specific score for each n-gram with the sum of topic-specific scores for the respective n-gram across all of the topics. In some cases, visualizations may reflect topics associated with corresponding elements.

In some embodiments, the data visualization module 824 may be operative to prepare data visualizations for display on user devices, e.g., visualizations of the graphs described herein. In some cases, such visualizations may include physics-based arrangements of nodes within a display, like a force-directed layout. In some cases, graph generation and visualization preparation takes place on system 802, and resulting interactive visualizations run (e.g., entirely) in a web browser of a user device. In some cases, this entails displaying and manipulating thousands of vertices and edges in an environment on user devices not known for speed. At the same time, in some use cases, users desire a relatively large amount of data on display, while keeping a responsive frame rate. To increase frame rate, some embodiments may use various techniques to optimize the network visualization and make the computer system run faster, including invoking WebGL commands to enlist a user's GPU in rendering a web page and pre-processing.

Graphs of real-world information are often relatively intricate. In some embodiments, visualizations may support real-time (e.g., in this context, with less than 500 ms latency) interactions with relatively large numbers of interactive objects, e.g., more than 500, like more than 1,000, and in some cases as many as 20,000 interactive objects with near zero latency. In some embodiments, this speed is accomplished by pre-processing physics models of graph layouts with a graphical processing units (GPUs) of the system 802, to reduce the computational burden on less powerful CPUs executing browsers on user devices. In some cases, displays may be relatively high dimensional, e.g., various visual attributes, like line weight, icon size, color, transparency, drop shadow offsets, or properties of physical models, like inertia, friction, attractive forces, repulsive forces, momentum, frequency of oscillation, and the like, may be mapped to different dimensions like those discussed above, e.g., similarity, relatedness, sentiment, and the like. Connections tend to be more relatively complicated and irregular, and embodiments often do not determine the visual shape of the graph ahead of time. Indeed, graph isomorphism provides for a relatively large number of visual arrangements of otherwise identical graphs, but many arrangements are relatively un-informative and difficult to visually parse to a human user consuming the resultant data.

To visualize graph relations, some embodiments of module 824 may arrange vertices (also referred to as nodes) and edges using a physics simulation that mimics the stretching of spider webs. Some spider-web-inspired representations may model interactions between each pair of vertices as a Coulomb-like repulsion and an additional Hooke-like attraction in the presence of an edge between the pair. A relatively weak gravitation-like force may be modeled to prevent separate components and isolated vertices from venturing too far from the network's center of mass. Thus, some embodiments may use this physics-based network layout. In some cases, the parameters and initial conditions of the physics based model may be determined by module 824, and instructions for executing the model and adjusting the model based on user input may be sent to the user device, e.g., in the form of JavaScript™ instructions that model, for instance, a user selecting and dragging a node as a force applied to the physics model. Embodiments are expected to appear relatively natural, and the hierarchy of a network's structure is expected to be readily apparent; both small and large network structures are exposed, which is expect to allow users to study relationships between groups of vertices on different scales.

Running a physics simulation in a user's browser can easily exceed the available computing resources, as the simulation can be inherently resource-intensive for larger, highly connected data sets. To mitigate this issue, some embodiments may exploit phenomena expected to arise as the size of the data scales. It is expected that, in some embodiments, the number of time steps consumed to achieve equilibrium starting with a random configuration of vertices scales linearly with the number of vertices. That is undesirable for presentation purposes (though some embodiments are consistent with this approach, particularly for smaller data sets). To mitigate this, some embodiments may arrange for initial conditions of the simulation so the equilibrium is attained faster.

To select initial conditions of the physics-based animation of this n-body system, some embodiments may perform a gradient descent optimization. Some embodiments may compute the gradient of the modeled system's energy (e.g., based on the forces affecting nodes), integrate that to compute momentum, and move the particles in the simulation representing nodes accordingly. Initial conditions of the gradient descent may be selected strategically in some cases to mitigate the effects of local minima in what is expected to be a relatively rough energy landscape (though embodiments are also consistent with random selection of initial conditions, like with a stochastic gradient descent). For instance, some embodiments may seed the simulation with a vertex configuration that is in the vicinity of the final destination. To this end, some embodiments may execute a discretized version of the problem and search through all vertex configurations on a 2D grid.

This process is still of combinatorial complexity, however, and may be generally too expensive for some larger graphs. To mitigate this issue further some embodiments may simplify the search space to one dimension with space filling curves, like a z-curve or Hilbert curve that cover a 2D region of space with a one-dimensional curve. Such space-filling curves may be constructed via an iterative process, whereby at each step of the iteration the curve is refined at ever-finer scales. By ceasing iterations at a finite step, some embodiments may obtain a curve with just enough points to accommodate the data at issue. Further benefits, in some embodiments may arise from the property of some space filling curves: the 2D distance between any pair of vertices is well-approximated by (the square root of) the distance along the curve. In this scenario, in some embodiments, the problem of finding an approximate 2D layout is equivalent to finding an energy-optimal linear ordering of vertices, which some embodiments may use to implement less computationally intensive heuristics, circumventing the initial combinatorial complexity. That said, not all embodiments provide this benefit, as the various inventions described herein are independently useful.

Figure 9:
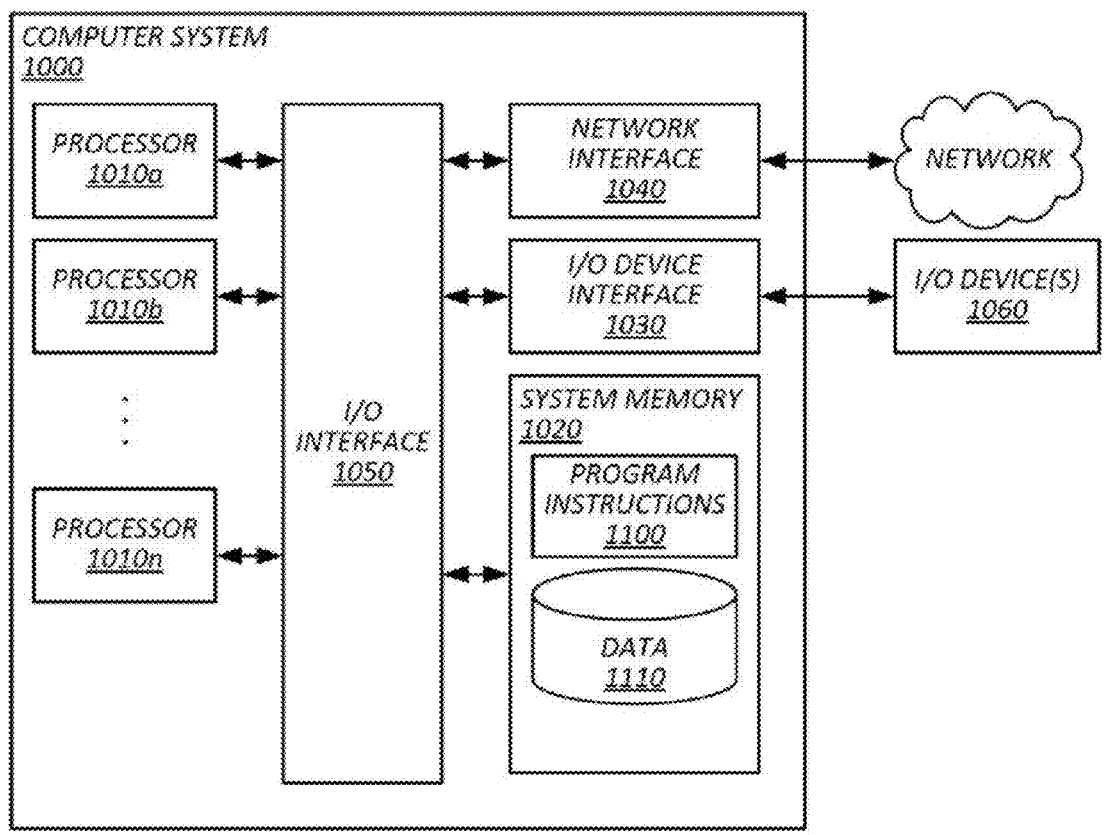
FIG. 9 illustrates an example of a computer system by which the above techniques may be implemented.

FIG. 9 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

Figure 10:
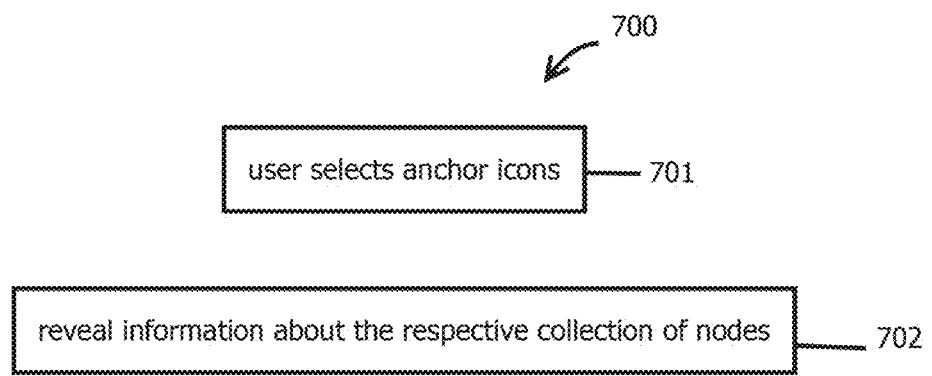
FIG. 10 shows a collection of operations.

FIG. 10 shows a collection of operations 700. The operations include: the user selecting an anchor icon 701; and revealing information about the respective collection of nodes 702.

FIG. 11 shows a collection of operations 703. The operations include: determining (in block 704) a feature vector for each document, each feature vector having plurality of scores, each score corresponding to a given n-gram and being based on: an amount of occurrences of the given n-gram in the respective document, a length of the respective document, an amount of occurrences of the given n-gram in a plurality of other documents different from the respective document, and whether the given n-gram is among the set of n-grams pertaining to the selected topic; and determining (in block 705) an adjacency matrix based on the feature vectors, wherein rows and columns of the adjacency matrix correspond to the documents, values of the feature matrix correspond to a selected-topic-adjusted semantic similarity of documents corresponding to the respective row and column of the values, and values of the feature matrix are based on angles between feature vectors of the documents corresponding to the respective row and column of the values, the operations comprising steps for reducing movement of data across a memory hierarchy; some of the icons are cluster icons that represent clusters of the graph; some of the icons are node icons that represent nodes of the clusters and are positioned in the visual representation adjacent a cluster icon of a cluster in which the corresponding node is disposed; determining a layout of the icons comprises determining a force directed layout in which the cluster icons are subject to different forces relative to the node icons; the segments correspond to quadrants of the field of view; determining positions of the text labels in the visual representation comprises: positioning a text label in an upper left quadrant upward and to the left of a corresponding icon; positioning a text label in a lower left quadrant downward and to the left of a corresponding icon; positioning a text label in an upper right quadrant upward and to the right of a corresponding icon; and positioning a text label in a lower right quadrant downward and to the right of a corresponding icon.

FIG. 12 shows a collection of operations 706. The operations include: sub-dividing (in block 707) the field of view according to a Voroni diagram of the icons positions after determining the layout to form a plurality of Voroni regions by performing a k-means cluster of vertical and horizontal coordinates of the icons in the field of view; segmenting (in block 708) each of the Voroni regions into a plurality of sectors about a point at a location selected based on a centroid of the respective Voroni region.

Figure 13:
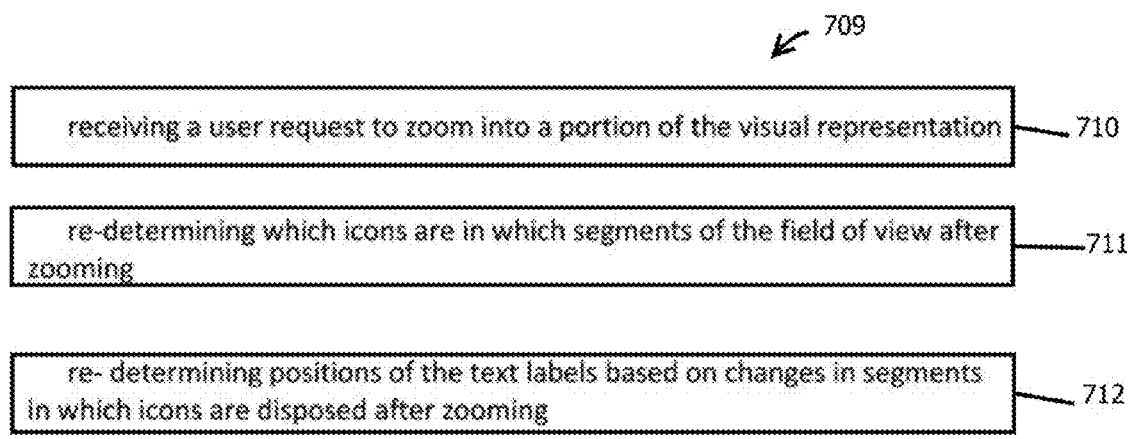
FIG. 13 shows a collection of operations.

FIG. 13 shows a collection of operations 709. The operations include: receiving (in block 710) a user request to zoom into a portion of the visual representation; re-determining (in block 711) which icons are in which segments of the field of view after zooming; and re-determining positions (in block 712) of the text labels based on changes in segments in which icons are disposed after zooming.

FIG. 14 shows a collection of operations 713. The operations include: animating a movement of a text label from a pre-zoom position relative to a corresponding icon to a post-zoom position relative to the corresponding icon by: animating movement according to an ease-in translation, an ease-out translation, or both; or animating movement according to an ease-in translation, an ease-out translation, or both.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A method of arranging labels on a visual representation of a graph data structure, the method comprising: obtaining, with one or more processors, a graph to be visually represented in a graphical user interface of a client computing device, the visual representation including a plurality of icons each representing one or more nodes of a graph data structure and links extending between the icons in the visual representation; obtaining, with one or more processors, a set of text labels each corresponding to a respective collection of the nodes; determining, with one or more processors, a two dimensional or higher layout of the icons in the visual representation within a field of view; segmenting, with one or more processors, the field of view into a plurality of segments; determining, with one or more processors, which icons are disposed within each of the segments of the field of view; determining, with one or more processors, positions of the text labels in the visual representation relative to one or more icons representing nodes in the respective collection of nodes based on the segment of the field of view in which the one or more icons representing nodes in the respective collection are disposed; and causing, with one or more processors, the visual representation to be displayed.

2. The method of embodiment 1, wherein: obtaining a graph comprises obtaining a clustered semantic similarity graph of documents based on semantic similarly of unstructured text in the documents by performing operations comprising: determining a feature vector for each document, each feature vector having plurality of scores, each score corresponding to a given n-gram and being based on: an amount of occurrences of the given n-gram in the respective document, a length of the respective document, an amount of occurrences of the given n-gram in a plurality of other documents different from the respective document, and whether the given n-gram is among the set of n-grams pertaining to the selected topic; and determining an adjacency matrix based on the feature vectors, wherein rows and columns of the adjacency matrix correspond to the documents, values of the feature matrix correspond to a selected-topic-adjusted semantic similarity of documents corresponding to the respective row and column of the values, and values of the feature matrix are based on angles between feature vectors of the documents corresponding to the respective row and column of the values, the operations comprising steps for reducing movement of data across a memory hierarchy; some of the icons are cluster icons that represent clusters of the graph; some of the icons are node icons that represent nodes of the clusters and are positioned in the visual representation adjacent a cluster icon of a cluster in which the corresponding node is disposed; determining a layout of the icons comprises determining a force directed layout in which the cluster icons are subject to different forces relative to the node icons; the segments correspond to quadrants of the field of view; determining positions of the text labels in the visual representation comprises: positioning a text label in an upper left quadrant upward and to the left of a corresponding icon; positioning a text label in a lower left quadrant downward and to the left of a corresponding icon; positioning a text label in an upper right quadrant upward and to the right of a corresponding icon; and positioning a text label in a lower right quadrant downward and to the right of a corresponding icon.

3. The method of any of embodiments 1-2, wherein the segments correspond to quadrants of the field of view.

4. The method of any of embodiments 1-3, wherein the segments correspond to at least three sectors of the field of view about a given point.

5. The method of embodiment 4, wherein the segments correspond to at least five sectors.

6. The method of embodiment 4, wherein the sectors are of the same angular size.

7. The method of embodiment 4, wherein at least some of the sectors have different angular sizes, the method comprising: determining angular sizes of each of the sectors based on an amount of icons corresponding to each of the sectors.

8. The method of embodiment 7, wherein determining angular sizes comprises balancing the number of icons among the sectors.

9. The method of embodiment 4, wherein the point is a center of the field of view.

10. The method of embodiment 4, wherein the point is determined based on positions of the icons in the field of view.

11. The method of embodiment 10, wherein the point corresponds to a centroid of the icons.

12. The method of any of embodiments 1-11, wherein segmenting the field of view comprises: sub-dividing the field of view according to a Voroni diagram of the icons positions after determining the layout to form a plurality of Voroni regions by performing a k-means cluster of vertical and horizontal coordinates of the icons in the field of view; segmenting each of the Voroni regions into a plurality of sectors about a point at a location selected based on a centroid of the respective Voroni region.

13. The method of any of embodiments 1-12, comprising: receiving a user request to zoom into a portion of the visual representation; re-determining which icons are in which segments of the field of view after zooming; and re-determining positions of the text labels based on changes in segments in which icons are disposed after zooming.

14. The method of embodiment 13, comprising: animating a movement of a text label from a pre-zoom position relative to a corresponding icon to a post-zoom position relative to the corresponding icon.

15. The method of embodiment 14, wherein animating movement comprises: animating movement according to an ease-in translation, an ease-out translation, or both.

16. The method of embodiment 15, wherein animating movement comprises: animating movement according to a cubic-Bezier translation.

17. The method of any of embodiments 1-16, wherein: obtaining a graph to be visually represented in a graphical user interface comprises performing steps for obtaining a graph; and determining a layout of the icons comprises steps for determining a layout of the icons.

18. The method of any of embodiments 1-17, wherein: segmenting the field of view comprises steps for segmenting the field of view; determining which icons are in each of the segments comprises steps for determining which icons are in each of the segments; determining positions of the text labels in the visual representation comprises: steps for determining positions of the text labels in the visual representation; and steps for animating movement between positions due to panning; causing the visual representation to be displayed comprises steps for causing the visual representation to be displayed.

19. The method of any of embodiments 1-18, comprising: providing a computational linguistics system configured to send the visual representation to a remote client computing device in a web browser of the remote client computing device.

20. The method of any of embodiments 1-19, wherein: each of the icons represents one node in a document-relationship graph; each of the links is a line extending between pairs of the nodes and indicating a relationship between corresponding documents; the layout comprises modeling pairwise interactions between the nodes that depend on distance between respective pairs of nodes as the respective pairs of nodes would appear in the visual representation; the text labels indicate respective categories of the respective collections of nodes.

21. The method of embodiment 20, wherein: visual representation includes user-selectable anchor icons visually associated in the visual representation with corresponding text labels.

22. The method of embodiment 21, wherein the anchor icons are user selectable to reveal information about the respective collection of nodes.

23. A tangible, non-transitory, machine-readable medium storing instructions that when executed by a data processing apparatus cause the data processing apparatus to perform operations comprising: the operations of any of embodiments 1-22.

24. A system, comprising: one or more processors; an memory storing instructions that when executed by the processors cause the processors to effectuate operations comprising: the operations of any of embodiments 1-22.

What is claimed is:

1. A method of arranging labels on a visual representation of a graph data structure, the method comprising:
obtaining, with one or more processors, a graph to be visually represented in a graphical user interface of a client computing device, the visual representation including a plurality of icons each representing one or more nodes of a graph data structure and links extending between the icons in the visual representation;
obtaining, with one or more processors, a set of text labels each corresponding to a respective collection of the nodes;
determining, with one or more processors, a two dimensional or higher layout of the icons in the visual representation within a field of view;
segmenting, with one or more processors, the field of view into a plurality of segments of the field of view;
determining, with one or more processors, which icons are disposed within each of the segments of the field of view;
determining, with one or more processors, positions of the text labels in the visual representation relative to one or more icons representing nodes in the respective collection of nodes based on the segment of the field of view in which the one or more icons representing nodes in the respective collection are disposed;
causing, with one or more processors, the visual representation to be displayed;
receiving a user request to zoom into a portion of the visual representation;
re-determining which icons are in which of the segments of the field of view after zooming; and
re-determining positions of the text labels based on changes in segments in which icons are disposed after zooming, wherein re-determining positions of the text labels based on changes in segments in which icons are disposed after zooming comprises:
determining a plurality of sets of sub-segments, each set of sub-segments having a plurality of sub-segments, each set of sub-segments corresponding to a respective cluster, each of the sets of sub-segments being centered at a different respective position of the field of view;
selecting, for each of the clusters, a respective sub-segment based on a segment of the field of view in which the respective cluster is disposed; and
positioning respective text labels for respective clusters or icons therein based on, and at least partially in, respective selected sub-segment corresponding to the respective clusters.

2. The method of claim 1, wherein:
each of the icons represents one node in a document-relationship graph;
each of the links is a line extending between pairs of the nodes and indicating a relationship between corresponding documents;
the layout comprises modeling pairwise interactions between the nodes that depend on distance between respective pairs of nodes as the respective pairs of nodes would appear in the visual representation;
the text labels indicate respective categories of the respective collections of nodes.

3. The method of claim 2, wherein:
visual representation includes user-selectable anchor icons visually associated in the visual representation with corresponding text labels.

4. The method of claim 3, wherein the anchor icons are user selectable to reveal information about the respective collection of nodes.

5. The method of claim 1, wherein:
obtaining a graph comprises obtaining a clustered semantic similarity graph of documents based on semantic similarly of unstructured text in the documents by performing operations comprising:
determining a feature vector for each document, each feature vector having plurality of scores, each score corresponding to a given n-gram and being based on:
an amount of occurrences of the given n-gram in the respective document,
a length of the respective document,
an amount of occurrences of the given n-gram in a plurality of other documents different from the respective document, and
whether the given n-gram is among the set of n-grams pertaining to the selected topic; and
determining an adjacency matrix based on the feature vectors, wherein rows and columns of the adjacency matrix correspond to the documents, values of the adjacency matrix correspond to a selected-topicadjusted semantic similarity of documents corresponding to the respective row and column of the values, and values of the adjacency matrix are based on angles between feature vectors of the documents corresponding to the respective row and column of the values, the operations comprising steps for reducing movement of data across a memory hierarchy;

some of the icons are cluster icons that represent clusters of the graph;

some of the icons are node icons that represent nodes of the clusters and are positioned in the visual representation adjacent a cluster icon of a cluster in which the corresponding node is disposed;

determining a layout of the icons comprises determining a force directed layout in which the cluster icons are subject to different forces relative to the node icons;

the segments correspond to quadrants of the field of view;

determining positions of the text labels in the visual representation comprises:

positioning a text label in an upper left quadrant upward and to the left of a corresponding icon;

positioning a text label in a lower left quadrant downward and to the left of a corresponding icon;

positioning a text label in an upper right quadrant upward and to the right of a corresponding icon; and positioning a text label in a lower right quadrant downward and to the right of a corresponding icon.

6. The method of claim 1, wherein the segments correspond to quadrants of the field of view.

7. The method of claim 1, wherein the segments correspond to at least three sectors of the field of view about a given point.

8. The method of claim 7, wherein the segments correspond to at least five sectors.

9. The method of claim 7, wherein the sectors are of the same angular size.

10. The method of claim 7, wherein at least some of the sectors have different angular sizes, the method comprising:
determining angular sizes of each of the sectors based on an amount of icons corresponding to each of the sectors.

11. The method of claim 10, wherein determining angular sizes comprises balancing the number of icons among the sectors.

12. The method of claim 10, wherein the point corresponds to a centroid of the icons.

13. The method of claim 7, wherein the point is a center of the field of view.

14. The method of claim 7, wherein the point is determined based on positions of the icons in the field of view.

15. The method of claim 1, wherein segmenting the field of view comprises:
sub-dividing the field of view according to a Voronoi diagram of the icons positions after determining the layout to form a plurality of Voronoi regions by performing a k-means cluster of vertical and horizontal coordinates of the icons in the field of view;
segmenting each of the Voronoi regions into a plurality of sectors about a point at a location selected based on a centroid of the respective Voronoi region.

16. The method of claim 1, wherein determining a plurality of sets of sub-segments comprises:
determining a plurality of sets of sub-segments quadrants, each set of sub-segment quadrants having four sub-segments, the sub-segment quadrants being selected based on a segment in the field of view in which a corresponding cluster is disposed.

17. The method of claim 1, comprising:
animating a movement of a text label from a pre-zoom position relative to a corresponding icon to a post-zoom position relative to the corresponding icon.

18. The method of claim 17, wherein animating movement comprises:
animating movement according to an ease-in translation, an ease-out translation, or both.

19. The method of claim 18, wherein animating movement comprises:
animating movement according to a cubic-Bezier translation.

20. The method of claim 1, wherein:
obtaining a graph to be visually represented in a graphical user interface comprises performing steps for obtaining a graph; and
determining a layout of the icons comprises steps for determining a layout of the icons.

21. The method of claim 1, wherein:
segmenting the field of view comprises steps for segmenting the field of view;
determining which icons are in each of the segments comprises steps for determining which icons are in each of the segments;
determining positions of the text labels in the visual representation comprises:
steps for determining positions of the text labels in the visual representation; and
steps for animating movement between positions due to panning;
causing the visual representation to be displayed comprises steps for causing the visual representation to be displayed.

22. The method of claim 1, comprising:
providing a computational linguistics system configured to send the visual representation to a remote client computing device in a web browser of the remote client computing device.

23. A system, comprising:
one or more processors; and
memory storing instructions that when executed by at least some of the processors effectuate operations comprising:
obtaining a graph to be visually represented in a graphical user interface of a client computing device, the visual representation including a plurality of icons each representing one or more nodes of a graph data structure and links extending between the icons in the visual representation;
obtaining a set of text labels each corresponding to a respective collection of the nodes;
determining a two dimensional or higher layout of the icons in the visual representation within a field of view;
segmenting the field of view into a plurality of segments;
determining, with one or more processors, which icons are disposed within each of the segments of the field of view of the field of view;
determining positions of the text labels in the visual representation relative to one or more icons representing nodes in the respective collection of nodes based on the segment of the field of view in which the one or more icons representing nodes in the respective collection are disposed;

causing the visual representation to be displayed;
receiving a user request to zoom into a portion of the visual representation;
re-determining which icons are in which segments of the field of view after zooming; and
re-determining positions of the text labels based on changes in segments in which icons are disposed after zooming, wherein re-determining positions of the text labels based on changes in segments in which icons are disposed after zooming comprises:
  determining a plurality of sets of sub-segments, each set of sub-segments having a plurality of sub-segments, each set of sub-segments corresponding to a respective cluster, each of the sets of sub-segments being centered at a different respective position of the field of view;
  selecting, for each of the clusters, a respective sub-segment based on a segment of the field of view in which the respective cluster is disposed; and
  positioning respective text labels for respective clusters or icons therein based on, and at least partially in, respective selected sub-segment corresponding to the respective clusters.

* * * * *